US012474530B2

(12) United States Patent
Broughton et al.

(10) Patent No.: US 12,474,530 B2
(45) Date of Patent: Nov. 18, 2025

(54) CONNECTOR PUSH RELEASE

(71) Applicant: CommScope Technologies LLC, Hickory, NC (US)

(72) Inventors: Adam Verne Broughton, Harrisburg, PA (US); Michael Lawrence Gurreri, York, PA (US)

(73) Assignee: CommScope Technologies LLC, Claremont, NC (US)

( * ) Notice: Subject to any disclaimer, the term of this patent is extended or adjusted under 35 U.S.C. 154(b) by 242 days.

(21) Appl. No.: 18/041,681

(22) PCT Filed: Aug. 12, 2021

(86) PCT No.: PCT/US2021/045774
§ 371 (c)(1),
(2) Date: Feb. 14, 2023

(87) PCT Pub. No.: WO2022/036119
PCT Pub. Date: Feb. 17, 2022

(65) Prior Publication Data
US 2023/0324626 A1 Oct. 12, 2023

Related U.S. Application Data

(60) Provisional application No. 63/065,711, filed on Aug. 14, 2020.

(51) Int. Cl.
*G02B 6/38* (2006.01)
(52) U.S. Cl.
CPC ......... *G02B 6/3831* (2013.01); *G02B 6/3825* (2013.01)

(58) Field of Classification Search
CPC ............................. G02B 6/3831; G02B 6/3825
See application file for complete search history.

(56) References Cited

U.S. PATENT DOCUMENTS

| 6,851,867 B2 * | 2/2005 | Pang .................... G02B 6/4261 |
| | | 385/59 |
| 9,885,841 B2 | 2/2018 | Pepe et al. |
| 10,359,577 B2 | 7/2019 | Dannoux et al. |
| 10,379,298 B2 | 8/2019 | Dannoux et al. |
| 10,422,962 B2 | 9/2019 | Coenegracht |
| 2005/0041407 A1 | 2/2005 | Torres et al. |
| 2014/0161397 A1 | 6/2014 | Gallegos et al. |
| 2016/0161681 A1 | 6/2016 | Banal, Jr. et al. |
| 2018/0284362 A1 | 10/2018 | Kadar-Kallen et al. |
| 2019/0181586 A1 | 6/2019 | Takano et al. |

OTHER PUBLICATIONS

International Search Report for PCT/US20211045774 mailed Dec. 6, 2021.

* cited by examiner

*Primary Examiner* — Sung H Pak
(74) *Attorney, Agent, or Firm* — Merchant & Gould P.C.

(57) ABSTRACT

A release member is mounted at the port of a plug receptacle to enable removal of a plug connector from the port. The plug connector is devoid of releasing structure to enable removal of the plug. The release member moves parallel to or coaxial with a plug insertion axis of the port. The release member is biased to a non-actuated position separately from a plug lock being biased to a locking position. The release member can carry a polarity indicator for the port; various shaped actuation sections; and/or a biasing member for the release member.

9 Claims, 28 Drawing Sheets

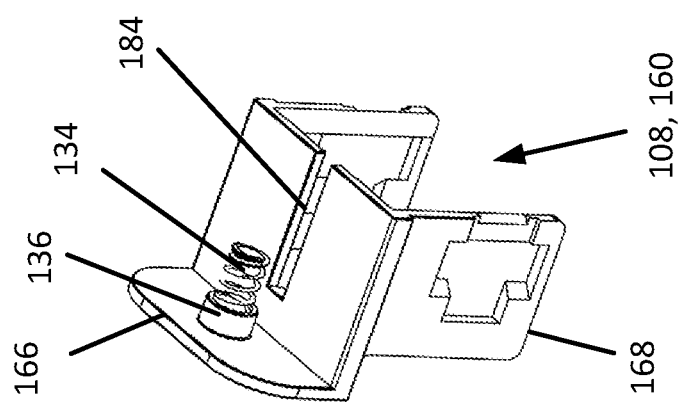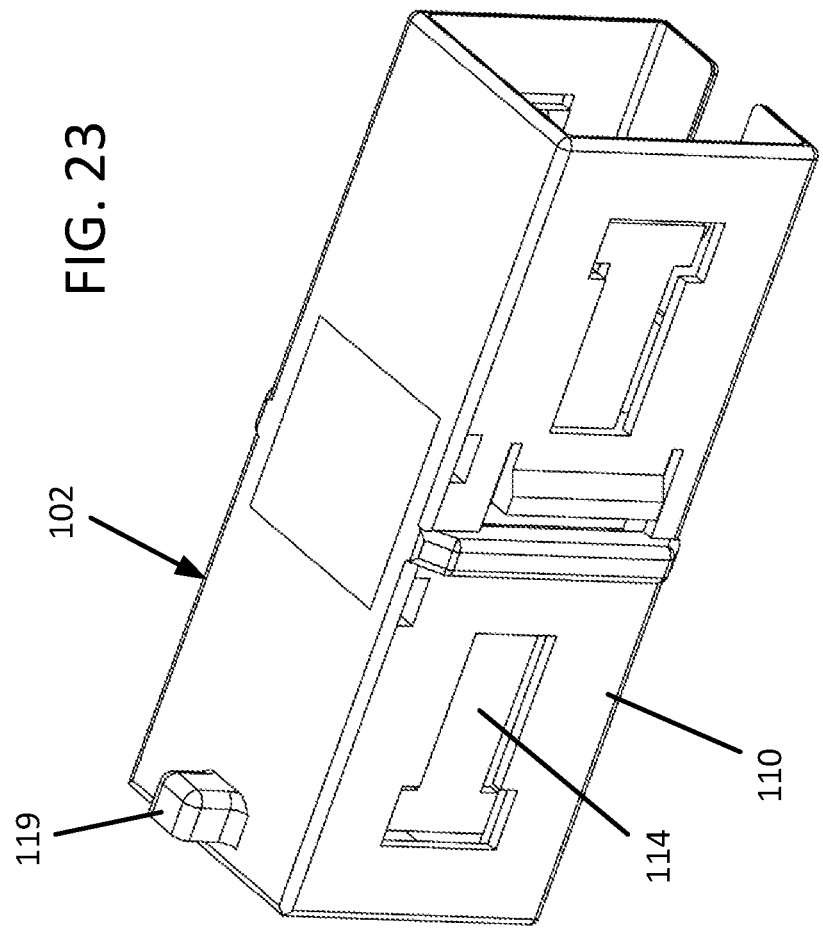
FIG. 23

CONNECTOR PUSH RELEASE

CROSS-REFERENCE TO RELATED APPLICATION

This application is being filed as a National Stage Application of PCT International Patent Application PCT/US2021/045774, filed on Aug. 12, 2021 and claims the benefit of U.S. patent application Ser. No. 63/065,711, filed on Aug. 14, 2020, the disclosure of which are incorporated herein by reference in their entireties.

BACKGROUND

Fiber optic communication systems are becoming prevalent in part because service providers want to deliver high bandwidth communication capabilities (e.g., data invoice) to customers. Many applications demands that cables pre-terminated with plug connectors pass through a narrow, tortuous path before being mated to connectors at equipment within a dwelling, an office, a commercial property, a data center, a central office, an outdoor terminal or closure, etc. Because of the location and other constraints, the pre-terminated cables are often threaded and routed through small holes in walls and/or through narrow ducts (e.g., less than 4 inches in diameter, less than 3 inches in diameter, less than 2 inches in diameter, less than 1.5 inches in diameter).

Improvements providing smaller plug connectors are desired.

SUMMARY

Some aspects of the disclosure are directed to a plug receptacle configured to receive a plug connector. The plug receptacle is configured to retain the plug connector within the plug receptacle. In certain examples, the plug connector does not carry any release mechanism to remove the plug connector from the plug receptacle once received. Rather, the plug receptacle carries a release member that enables removal of the plug connector from the plug receptacle.

In certain implementations, the plug receptacle includes a plug lock that is movable between locking and releasing positions. When in the locking position, the plug lock retains the plug connector received within the plug receptacle. When in the releasing position, the plug connector is freely removable from the plug receptacle. In certain examples, the release member is actuated to move the plug lock to the releasing position. In certain implementations, the release member is movable between an actuated position and a non-actuated position. When in the actuated position, the release member holds the plug lock in the releasing position. When in the non-actuated position, the release member frees the plug lock to move to the locking position.

In certain implementations, the plug lock is biased to the locking position. In certain implementations, actuating the release member moves the plug lock against the bias from the locking position to the releasing position. Releasing the release member allows the plug lock to be biased to the locking position. In certain implementations, the release member is biased to the non-actuated position. In certain examples, the release member is biased to the non-actuated position separate from the bias of the plug lock to the locking position. For example, the release member is biased by a spring (e.g., a leaf spring, a coil spring, etc.) that does not bias the plug lock. In some examples, the spring is disposed external of the plug receptacle. In other examples, the spring is disposed within the plug receptacle. In certain examples, the plug lock is biased to the locking position through a natural resiliency of the material of the plug lock. In an example, the plug lock includes one or more latch arms.

In certain implementations, the release member is aligned with the plug receptacle so that the plug connector passes through a portion of the release member to enter the plug receptacle. In some examples, the release member includes a release sleeve that defines a through-passage that aligns with the receptacle; the release sleeve surrounds the plug connector when the plug connector passes through the through-passage and into the plug receptacle. In other examples, the release member includes a saddle that defines a channel that aligns with the receptacle; the saddle straddles the plug connector as the plug connector passes along the channel and into the receptacle.

In certain implementations, the release member is movable along an actuation axis that extends either coaxial or parallel with an insertion axis along which a plug connector can be inserted into the receptacle. For example, the release member is moved further into the plug receptacle when moved to the actuated position. In some examples, the release member is a release sleeve that moves coaxially along the insertion axis when moved to the actuated position. In other examples, the release member is a release saddle that moves in parallel with the insertion axis when moved to the actuated position. In still other examples, the release saddle may define a sufficiently large channel to move coaxially along the insertion axis.

In certain implementations, the release member carries a polarity key to ensure the plug connector is inserted into the plug receptacle in a pre-determined rotational orientation. The polarity key mates with a keying structure of the plug connector when the plug connector passes the release member and into the plug receptacle. In certain examples, the polarity key includes a protruding tab and the keying structure includes a channel defined on the plug connector that receives the protruding tab.

In some implementations, the release member is mounted at the plug receptacle prior to the plug connector being received at the plug receptacle. For example, the release member may include a release sleeve through which the plug connector passes to access the plug receptacle. In other implementations, the release member is retrofittable to the plug receptacle after the plug connector is receive within the plug receptacle. For example, the release member may define a channel allowing the release member to be laterally mounted over the plug connector and then slid along an exterior of the plug connector and into the plug receptacle.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 23 is a perspective view of the release member of FIG. 22 exploded outwardly from an example plug receptacle;

DETAILED DESCRIPTION

Figure 1:
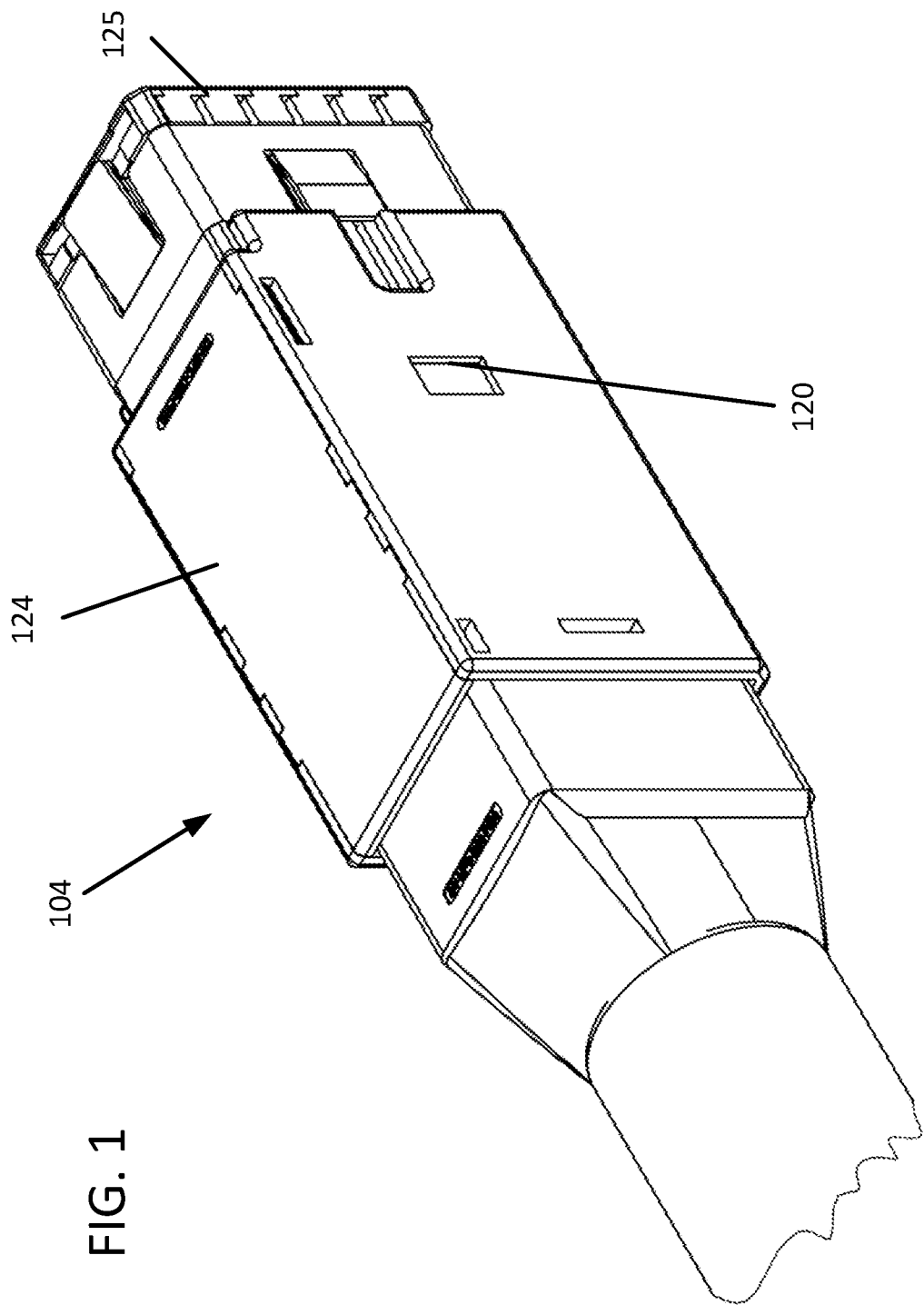
FIG. 1 is a perspective view of an example plug connector devoid of a release mechanism for removing the plug connector from a plug receptacle.
Figure 2:
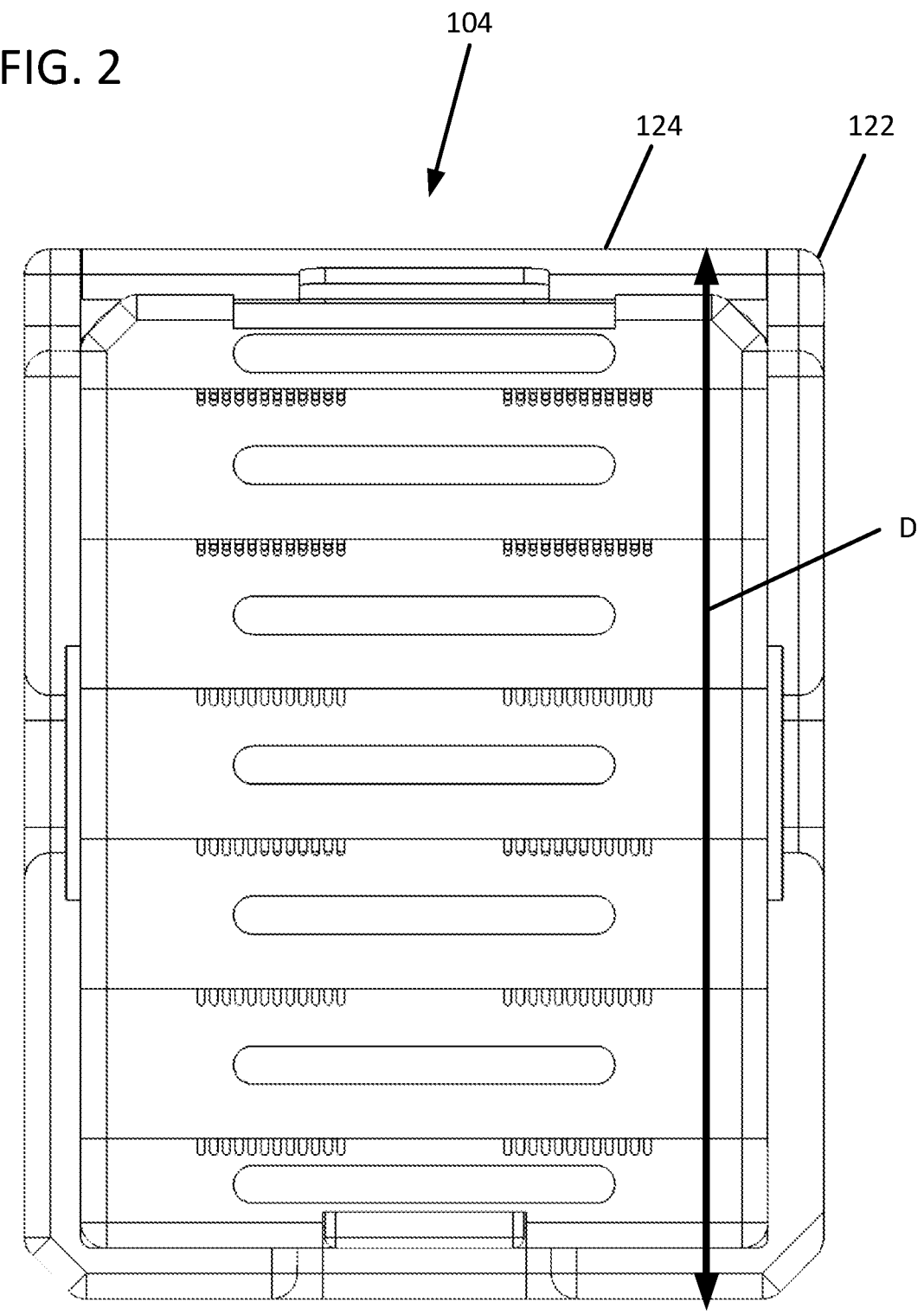
FIG. 2 is a front view of the plug connector of FIG. 1 so that an outer footprint of the plug connector is visible.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a connection system 100 includes a plug receptacle 102 and a plug connector 104 configured to be received thereat. The plug receptacle 102 defines a port through which the plug connector 104 enters the plug receptacle 102 along an insertion axis I. The plug receptacle 102 also includes a plug lock 106 that holds the plug connector 104 within the receptacle 102. The plug receptacle 102 also carries a release member 108 that selectively releases the plug connector 104 from the plug lock 106.

FIG. 1 illustrates an example plug connector 104 that does not include an actuatable release mechanism for releasing the plug connector 104 from a receptacle 102. Rather, the plug connector 104 defines one or more catch surfaces 120 that can be engaged by the plug lock 106 when the plug connector 104 is received within the receptacle 102. In certain examples, the catch surfaces 120 are recessed within a footprint 122 of an outer body 124 of the plug connector 104. In certain examples, no structure carried by the plug connector 104 protrudes beyond the footprint 122. Accordingly, the outer body 124 of the plug connector 104 defines a maximum transverse cross-dimension D of the plug connector 104. In certain examples, the maximum transverse cross-dimension D of the plug connector 104 is no more than 25 mm. In certain examples, the maximum transverse cross-dimension D of the plug connector 104 is no more than 23 mm. In certain examples, the maximum transverse cross-dimension D of the plug connector 104 is no more than 21 mm.

In some implementations, the plug connector 104 is an optical plug connector. In some examples, the optical plug connector 104 terminates a single optical fiber. In other examples, the optical plug connector 104 terminates multiple optical fibers (e.g., two fibers, twelve fibers, sixteen fibers, twenty-four fibers, seventy-two fibers, ninety-six fibers, 144 fibers, 256 fibers, 288 fibers, etc.). In some examples, the optical plug connector 104 includes a ferrule holding the one or more optical fibers. In other examples, the optical plug connector 104 is a ferrule-less connector. In other implementations, the plug connector 104 is an electrical plug connector (e.g., terminating twisted pair conductors, coaxial conductors, etc.). In still other implementations, the plug connector 104 is a hybrid plug connector (e.g., terminating both one or more optical fibers and one or more electrical conductors).

Figure 3:
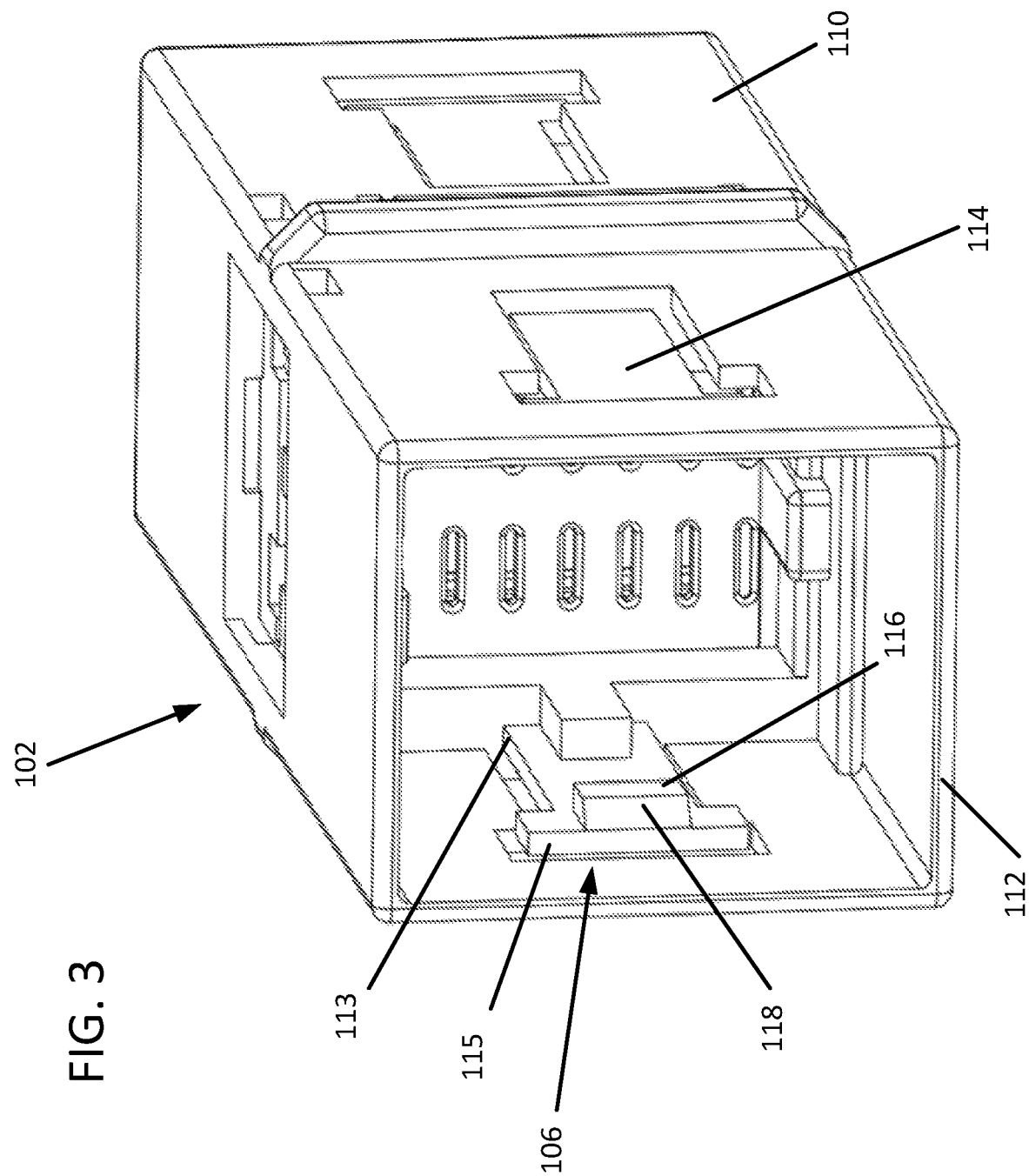
FIG. 3 is a perspective view of an example plug receptacle including a plug lock configured to receive and retain the plug connector of FIG. 1.
Figure 5:
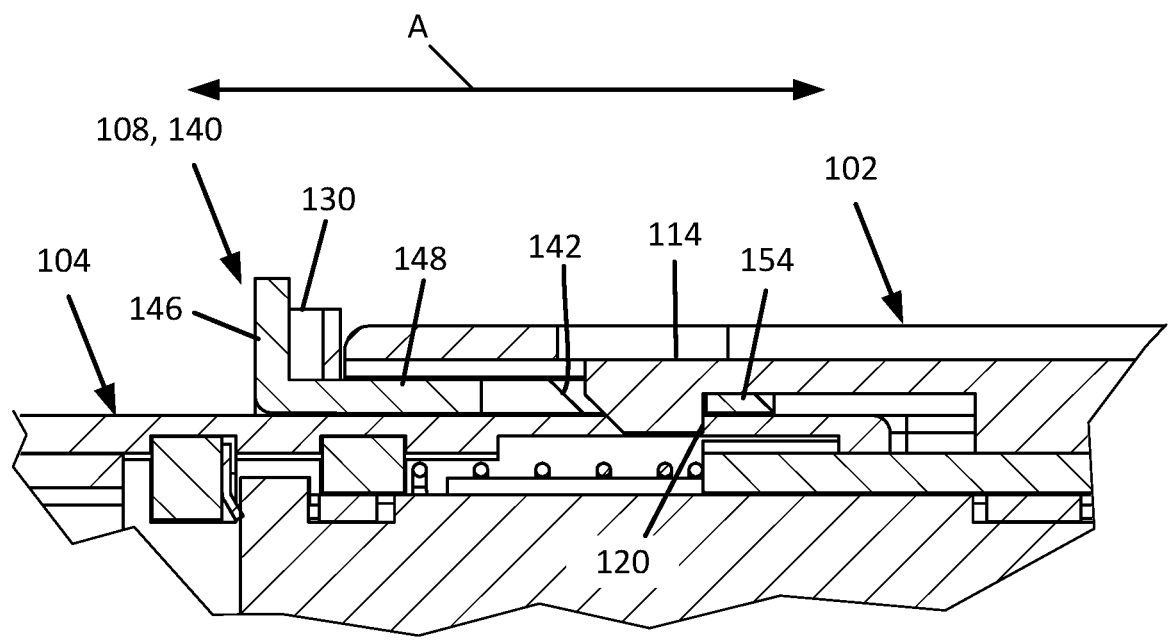
FIG. 5 is an enlarged view of a portion of FIG. 4 showing the release member in a non-actuated position and the plug lock in a locking position.

FIG. 3 illustrates an example plug receptacle 102 configured to carry a release sleeve 108 in accordance with the principles of the present disclosure. The plug receptacle 102 includes a body 110 that defines a port 112 through which the plug connector 104 enters the receptacle 102 along an insertion axis I (FIG. 5). The body 110 carries the plug lock 106, which is movable relative to the body 110 between a locking position and a releasing position. The plug lock 106 engages the plug connector 104 when the plug lock 106 is disposed in the locking position; the plug lock 106 disengages the plug connector 104 when the plug lock 106 is disposed in the releasing position. In some implementations, the plug lock 106 is monolithically formed with the main body 110 of the plug receptacle 102 (e.g., see FIG. 3). In other implementations, the plug lock 106 is a separate piece that can be mounted to the main body 110 even when no plug connector 104 is received at the plug receptacle 102.

Figure 4:
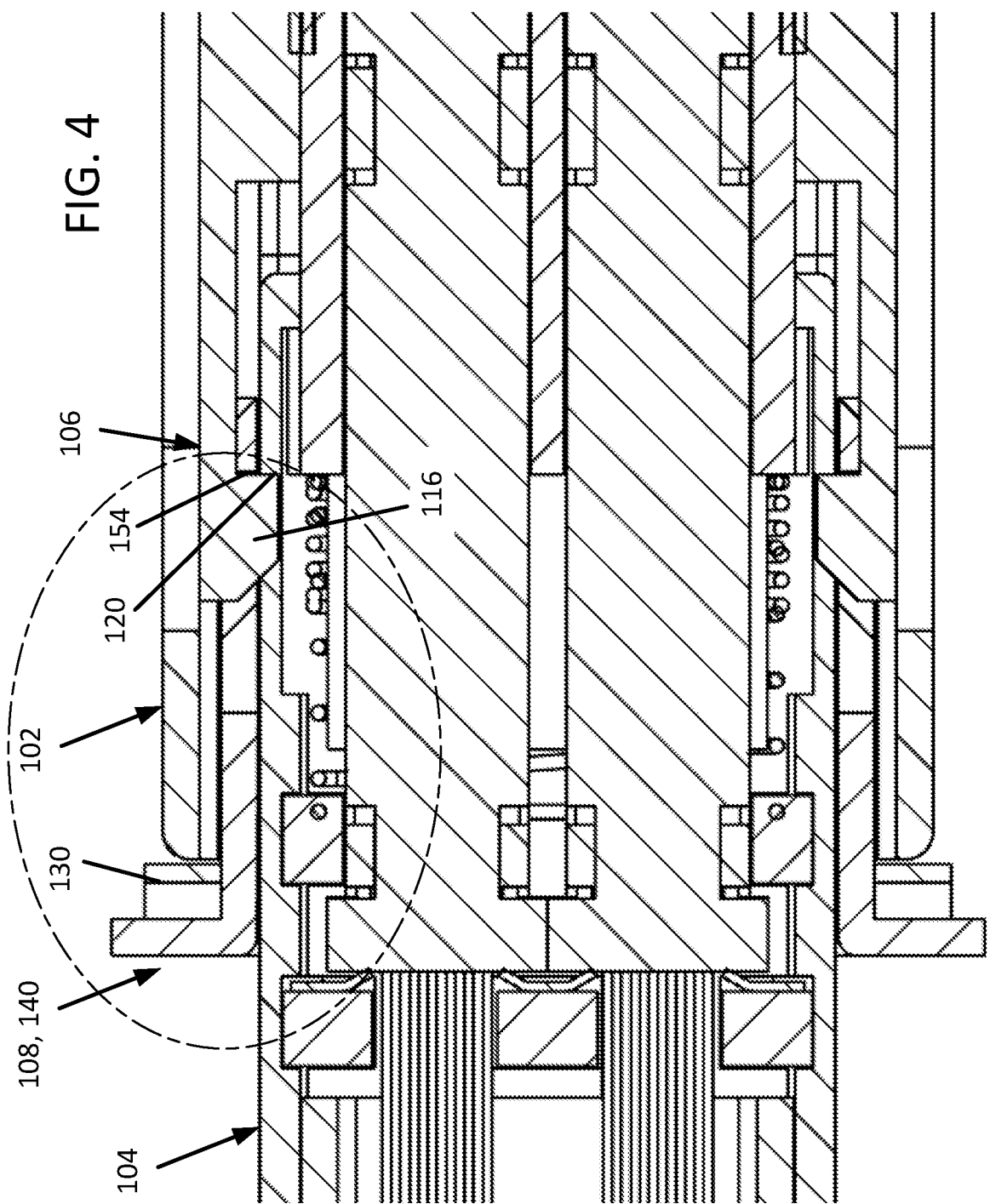
FIG. 4 is a cross-sectional view of the plug connector of FIG. 1 received within a port of the plug receptacle of FIG. 3 to which is coupled a first example release member.

In certain implementations, the plug lock 106 moves laterally away from the plug connector 104 when moved to the releasing position. In certain implementations, the plug lock 106 is deflectable between the locking and releasing positions. For example, the plug lock 106 may include one or more latch arms 114 having mounting ends 113 coupled (e.g., monolithically formed with or attached to) the main body 110 and opposite deflecting ends 115 that deflect away from the interior of the receptacle 102 when moved to the releasing position. In certain examples, each latch arm 114 include a latching tab 116 at the deflecting end of the latch arm 114. The latching tab 116 extends into the outer body 124 of the plug connector 104 and engages a respective recessed catch surface 120 to retain the plug connector 104 (e.g., see FIG. 4). Deflecting the latching arm 114 laterally away from the plug connector 104 disengages the latching tab 116 from the catch surface 120. In certain examples, the plug connector 104 defines two oppositely-facing catch surfaces 120 and the plug lock 106 includes two opposing latch arms 114 that engage the catch surfaces 120.

In certain implementations, the plug lock 106 is biased to the locking position. In some examples, the plug lock 106 is biased to the locking position by a natural resiliency of the material forming the plug lock 106. For example, the latch arms 114 may be configured so that the latching tabs 116 are normally disposed in the locking position until deflected outwardly. In other examples, the plug lock 106 can be biased to the locking position by a separate spring arrangement of one or more springs.

In certain examples, insertion of the plug connector 104 temporarily moves the plug lock 106 to the releasing position until the plug connector 104 is fully received within the plug receptacle 102 without use of the release member 108. For example, the latching tabs 116 may define camming surfaces 118 that engage the plug connector 104 (e.g., a leading edge of the outer body 124) as the plug connector 104 is inserted into the port 112 of the main body 110. The plug connector 104 pushes against the camming surfaces 118 to deflect the latching tabs 116 of the latch arms 114 outwardly to enable the outer plug body 124 to clear the latching tabs 116. In such examples, the latching tabs 116 snap-fit into the recesses in the outer body 124 and engage the catch surfaces 120 when the latching tabs 116 align with the recesses.

Figure 27:
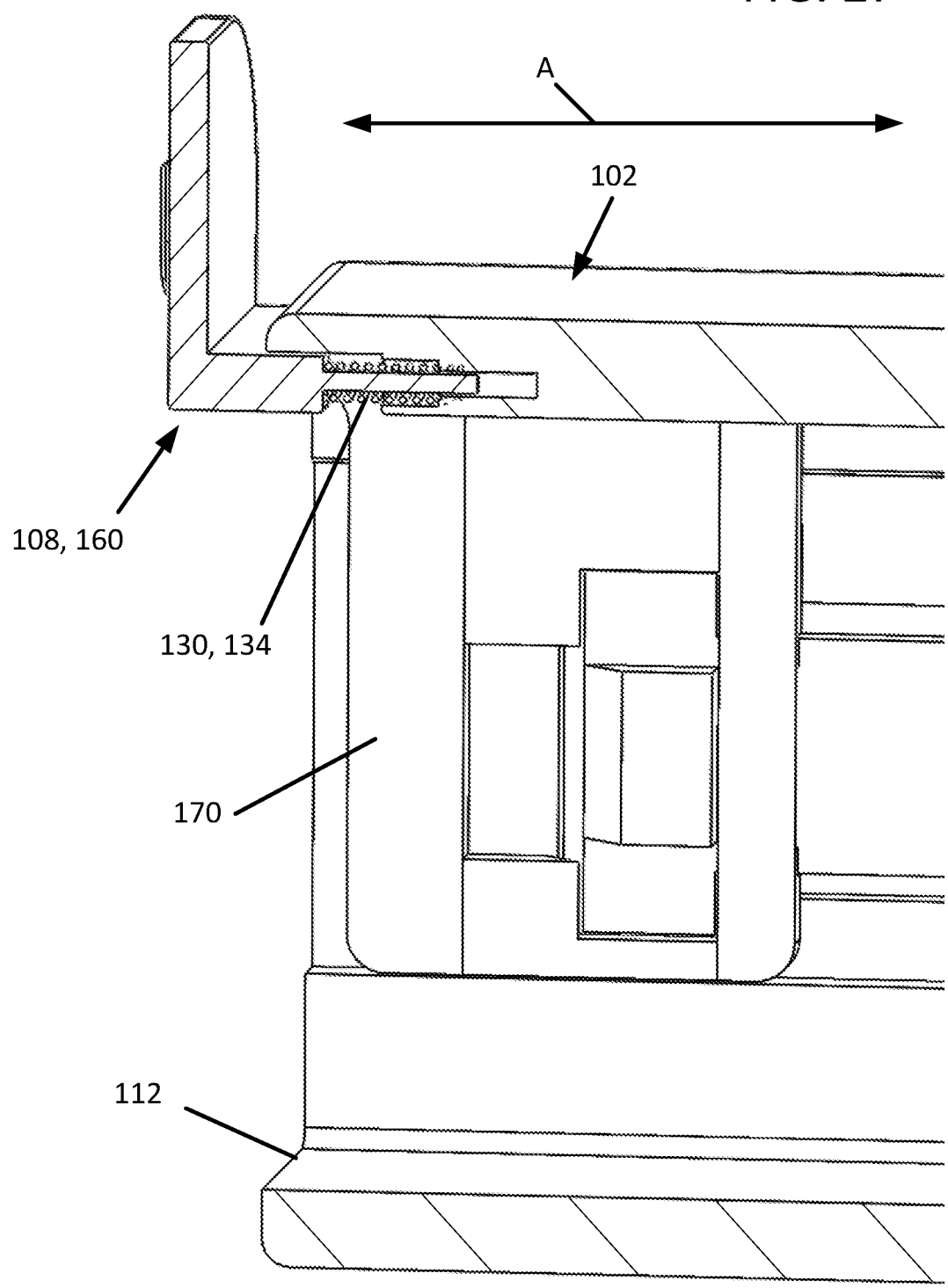
FIG. 27 is a perspective view of an axial cross-section of an example plug receptacle and saddle type release member having an internal biasing member.
Figure 28:
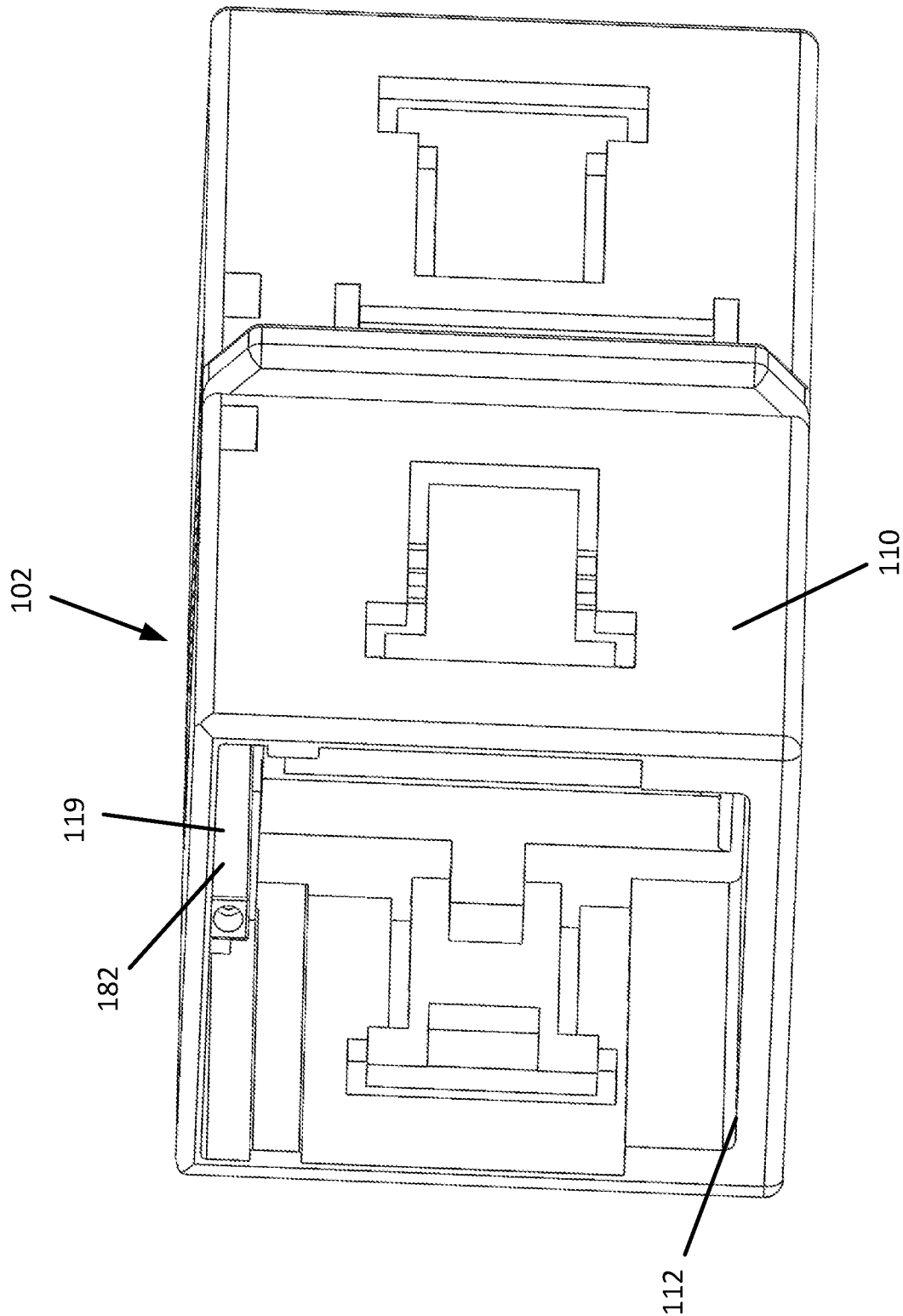
FIG. 28 is a perspective view of an example plug receptacle configured to accommodate the internal biasing member of FIG. 27.
Figure 29:
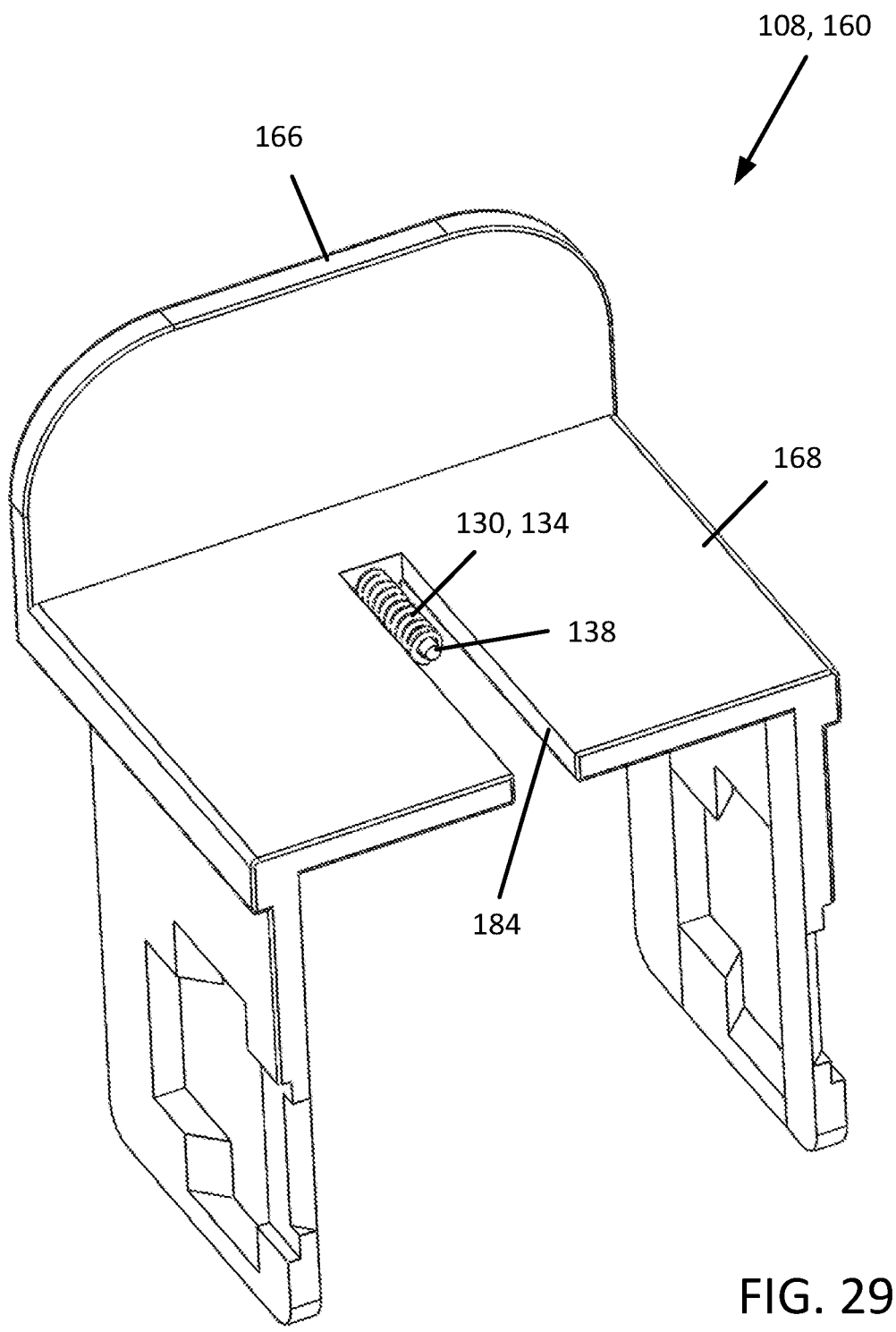
FIG. 29 is a perspective view of an example release member carrying a biasing member and configured to mount to the plug receptacle of FIG. 28.

Referring now to FIGS. 5-29, a release member 108 is coupled to the receptacle main body 110 even when the plug connector 104 is not received at the port 112. FIGS. 5-11 illustrate a first type 140 of release member 108; FIGS. 12-17 illustrate a second type 160 of release member 108. FIGS. 18-21 illustrate a polarity indicator 180 that can be utilized with both release member types 140, 160; FIGS. 22-26 illustrate how the second type 160 of release member 108 can be retrofit to a plug receptacle 102 even after a plug connector 104 is received at the port 112; and FIGS. 27-29 illustrate an alternative biasing member usable with both release member types 140, 160.

Figure 11:
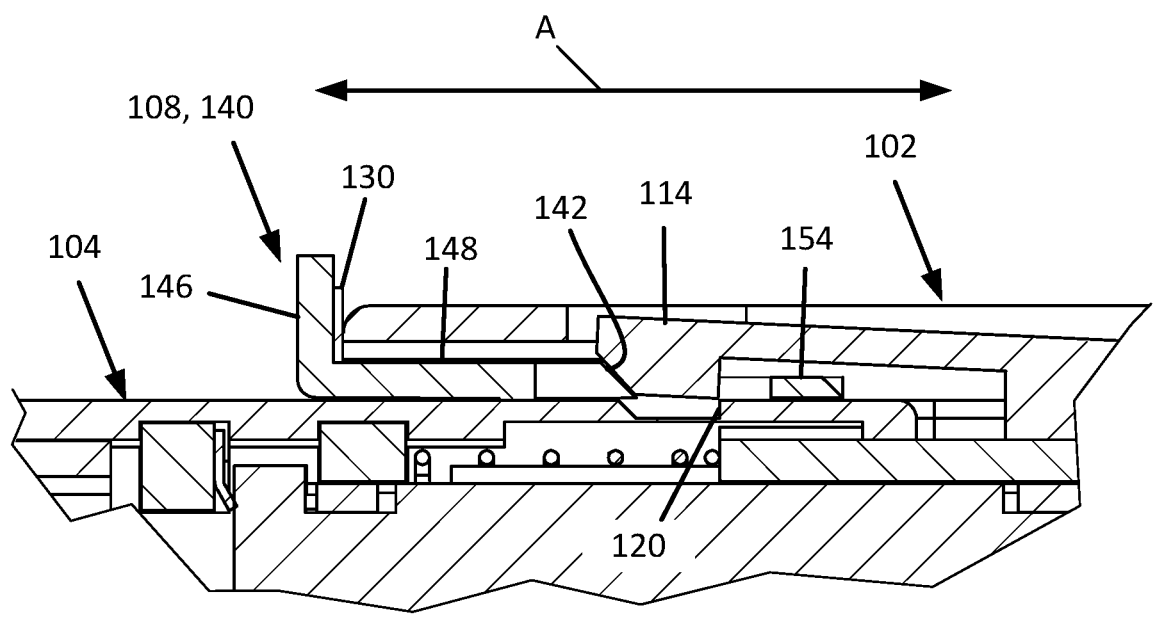
FIG. 11 is an enlarged view of the portion of FIG. 4 shown in FIG. 5, but with the release member moved to an actuated position and the plug lock moved to a releasing position.
Figure 6:
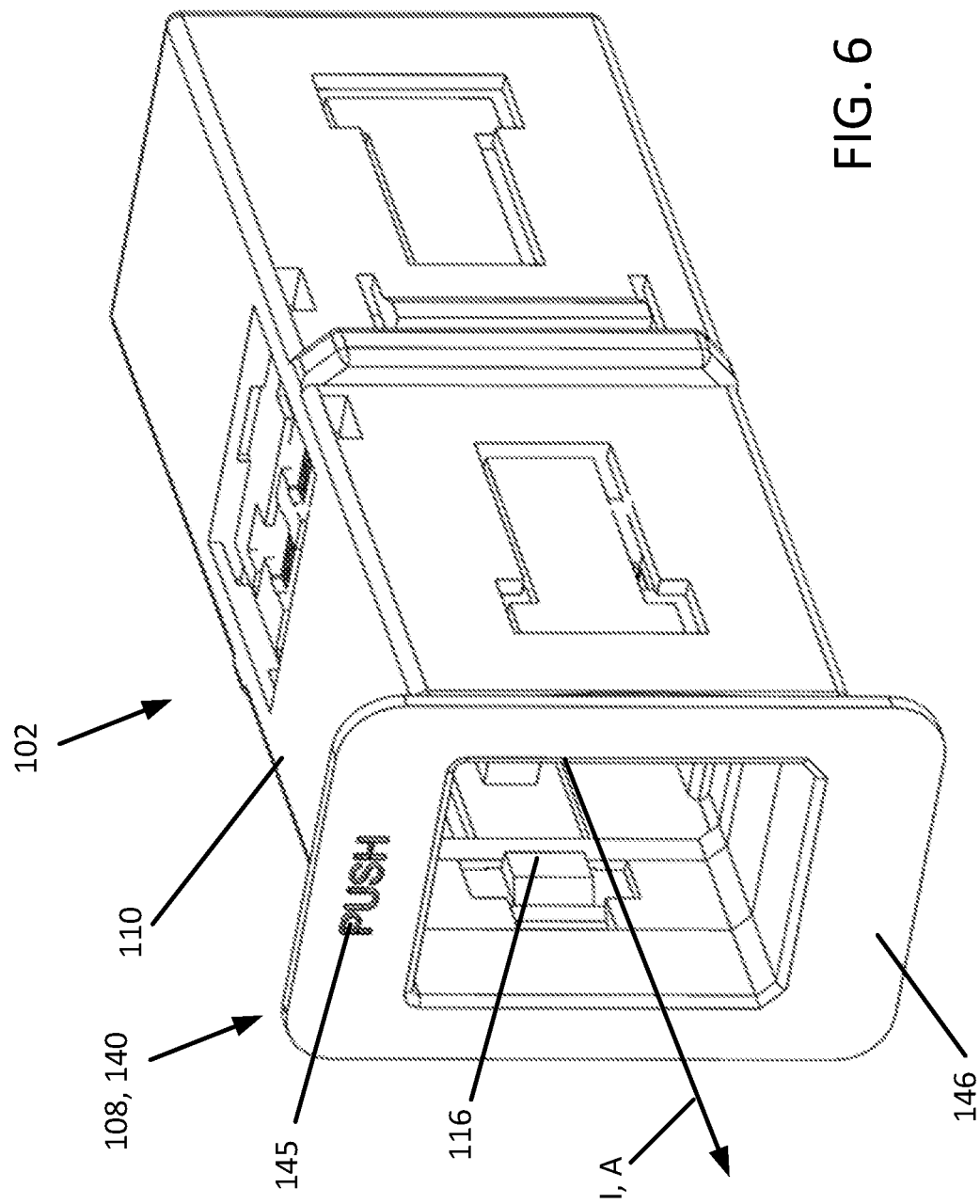
FIG. 6 is a perspective view of the plug receptacle and release member of FIG. 4 with the plug connector removed for ease in viewing the port.
Figure 7:
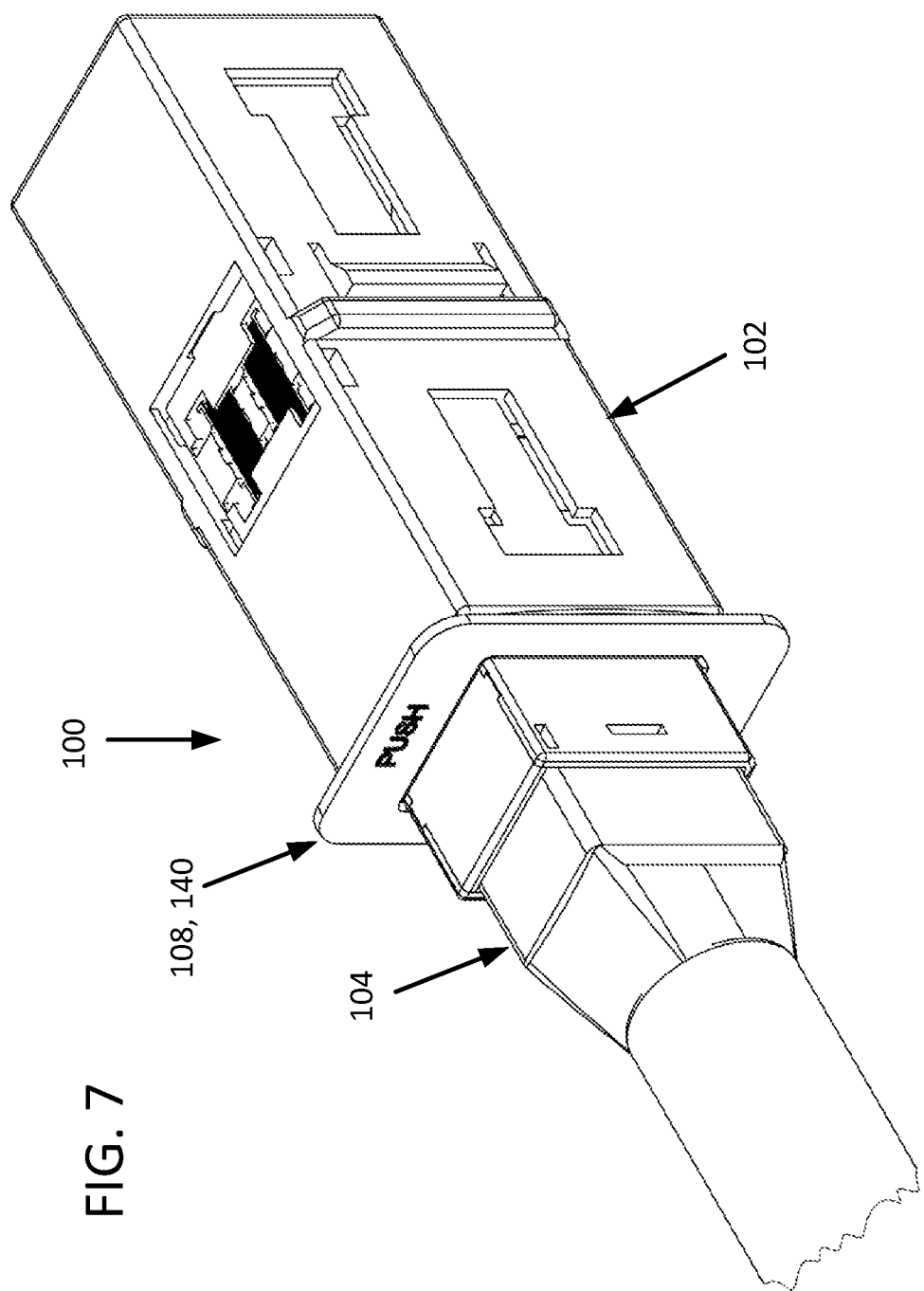
FIG. 7 is a perspective view of an example connection system including the plug receptacle and release member of FIG. 6 with the plug connector of FIG. 1 received at the port.
Figure 8:
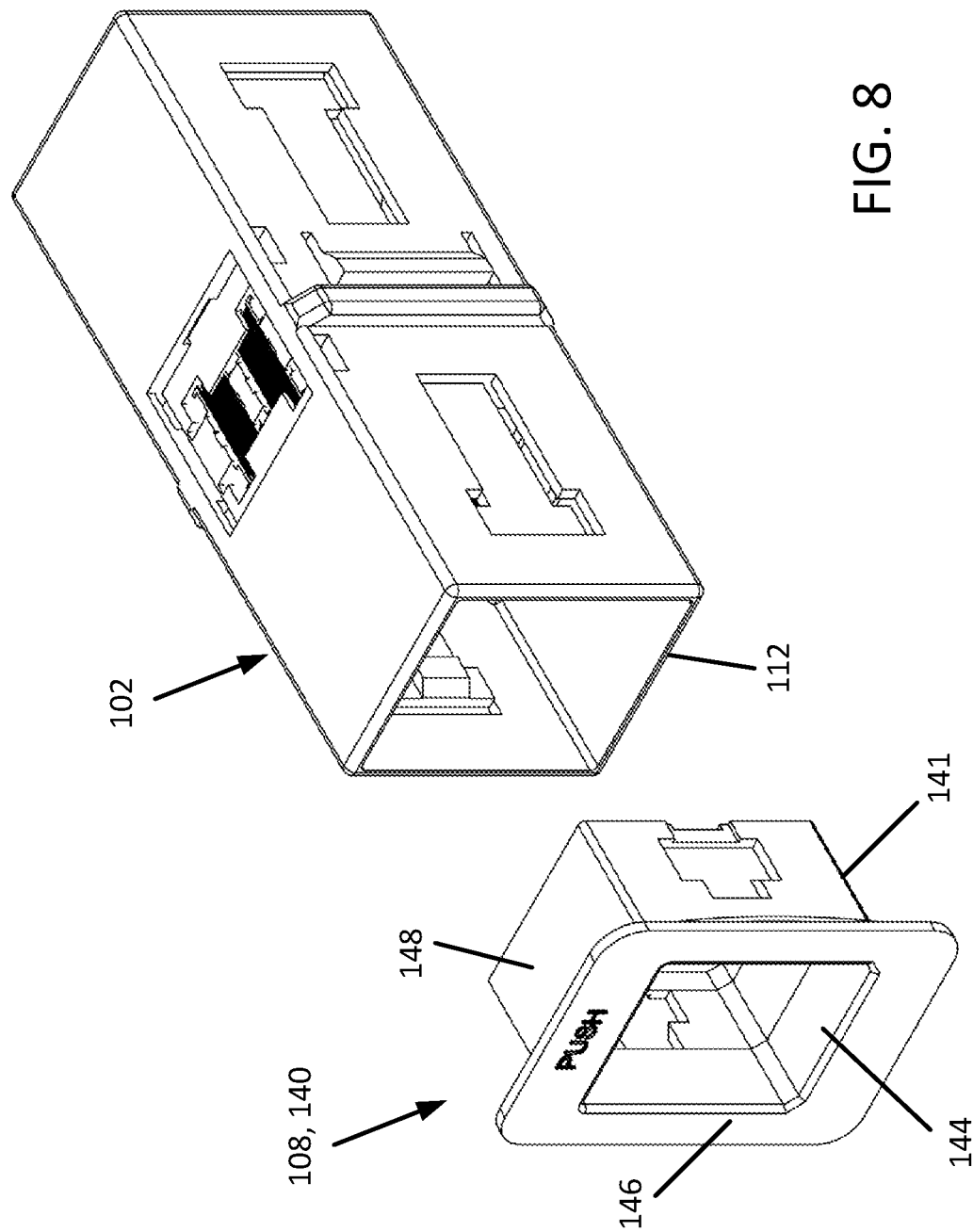
FIG. 8 is an exploded view of the plug receptacle and release member of FIG. 6.
Figure 9:
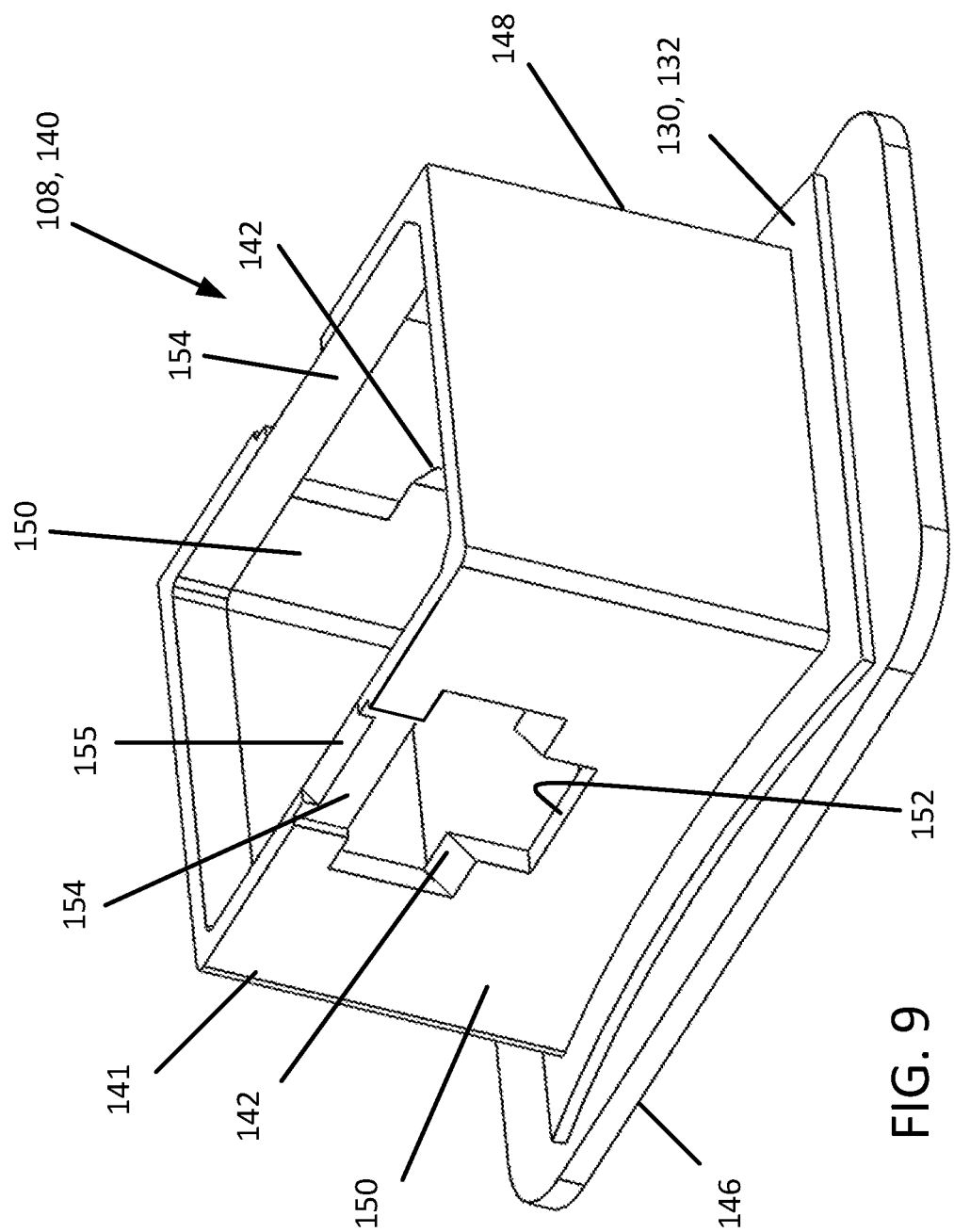
FIG. 9 is a perspective view of the first example release member of FIG. 6.
Figure 10:
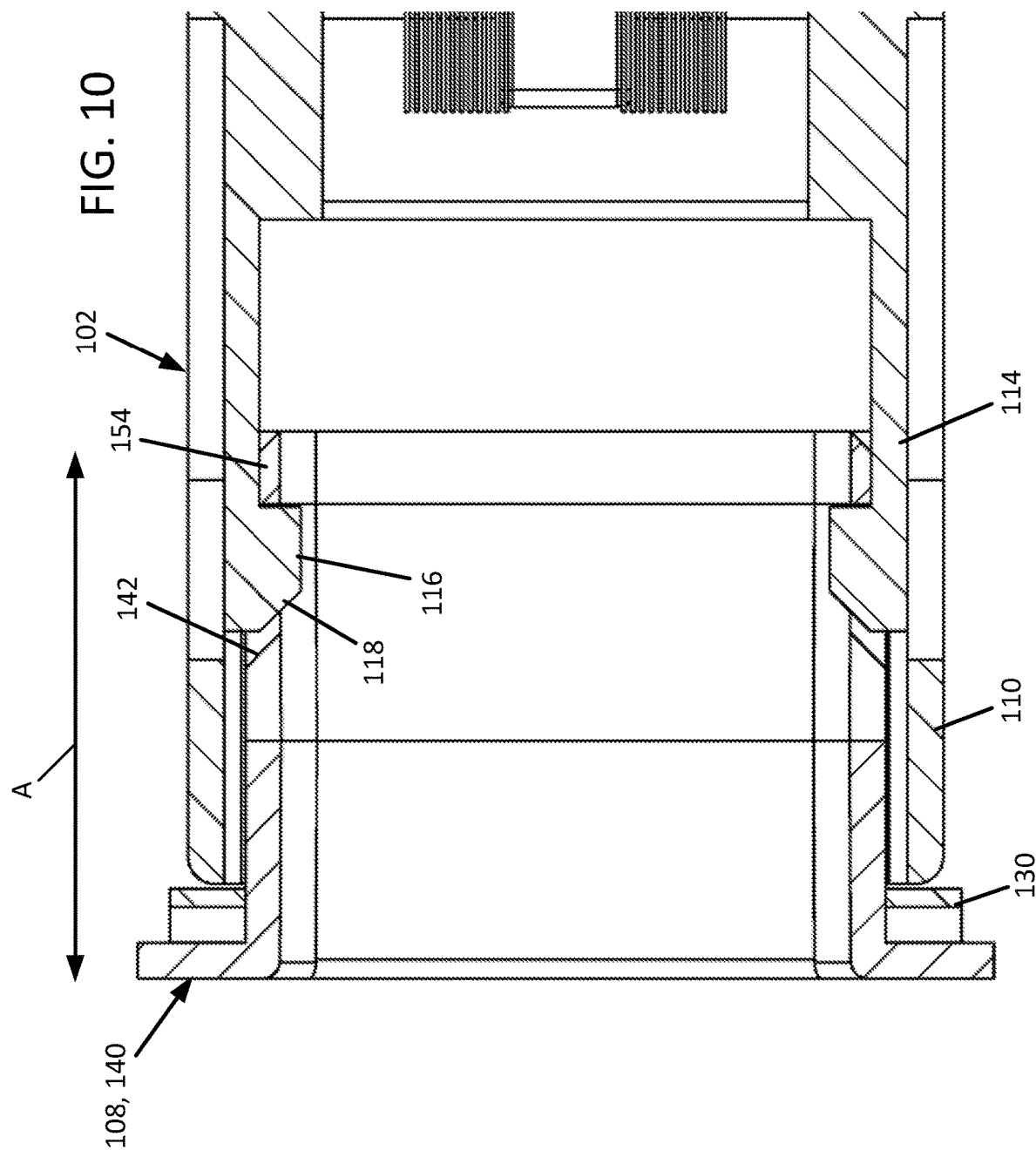
FIG. 10 is a cross-sectional view of the plug receptacle and release member of FIG. 4 with the plug connector removed for ease in viewing the interaction between the plug lock and the release member.
Figure 12:
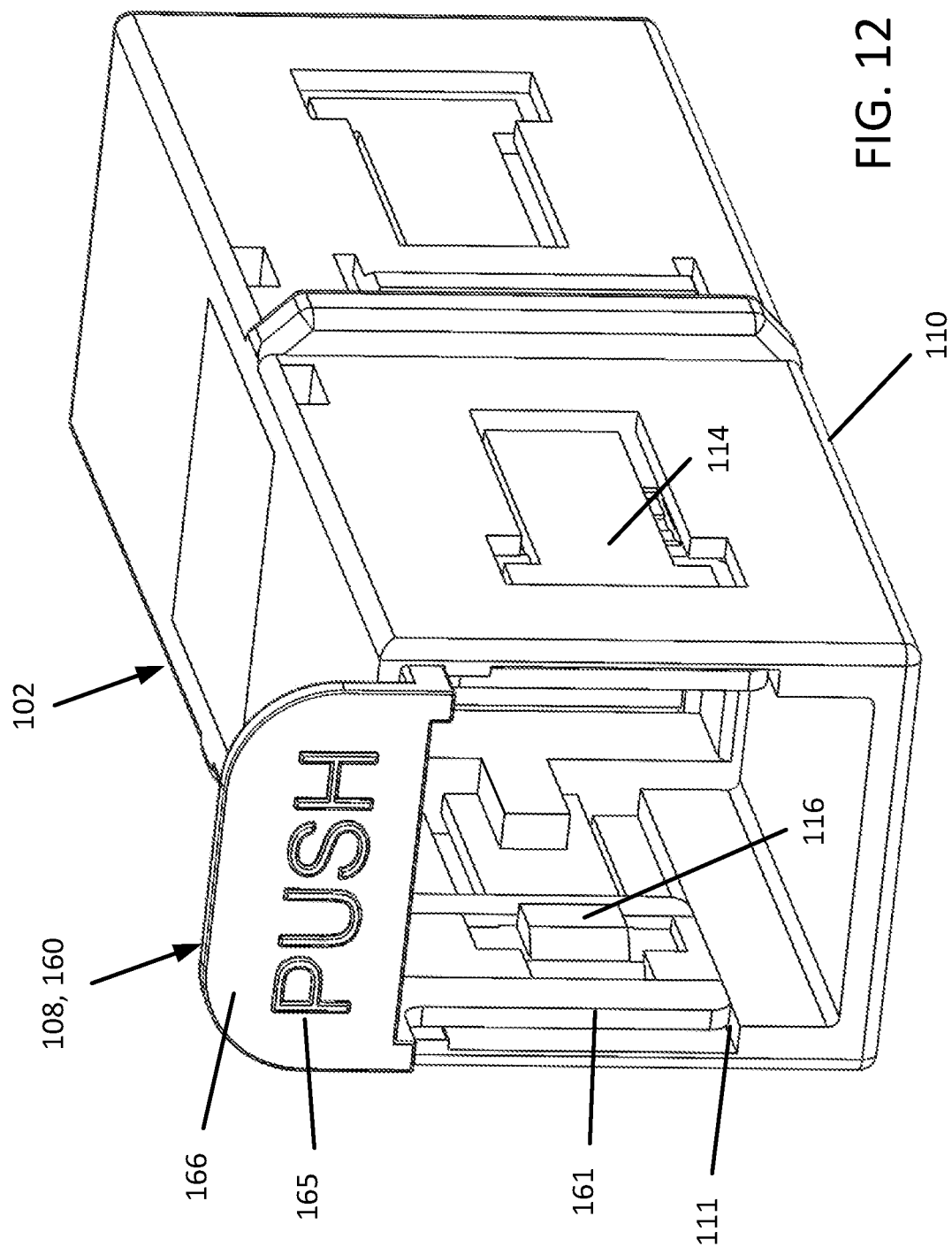
FIG. 12 is a perspective view of a second example release member coupled to another example plug receptacle including the plug lock of FIG. 3.
Figure 13:
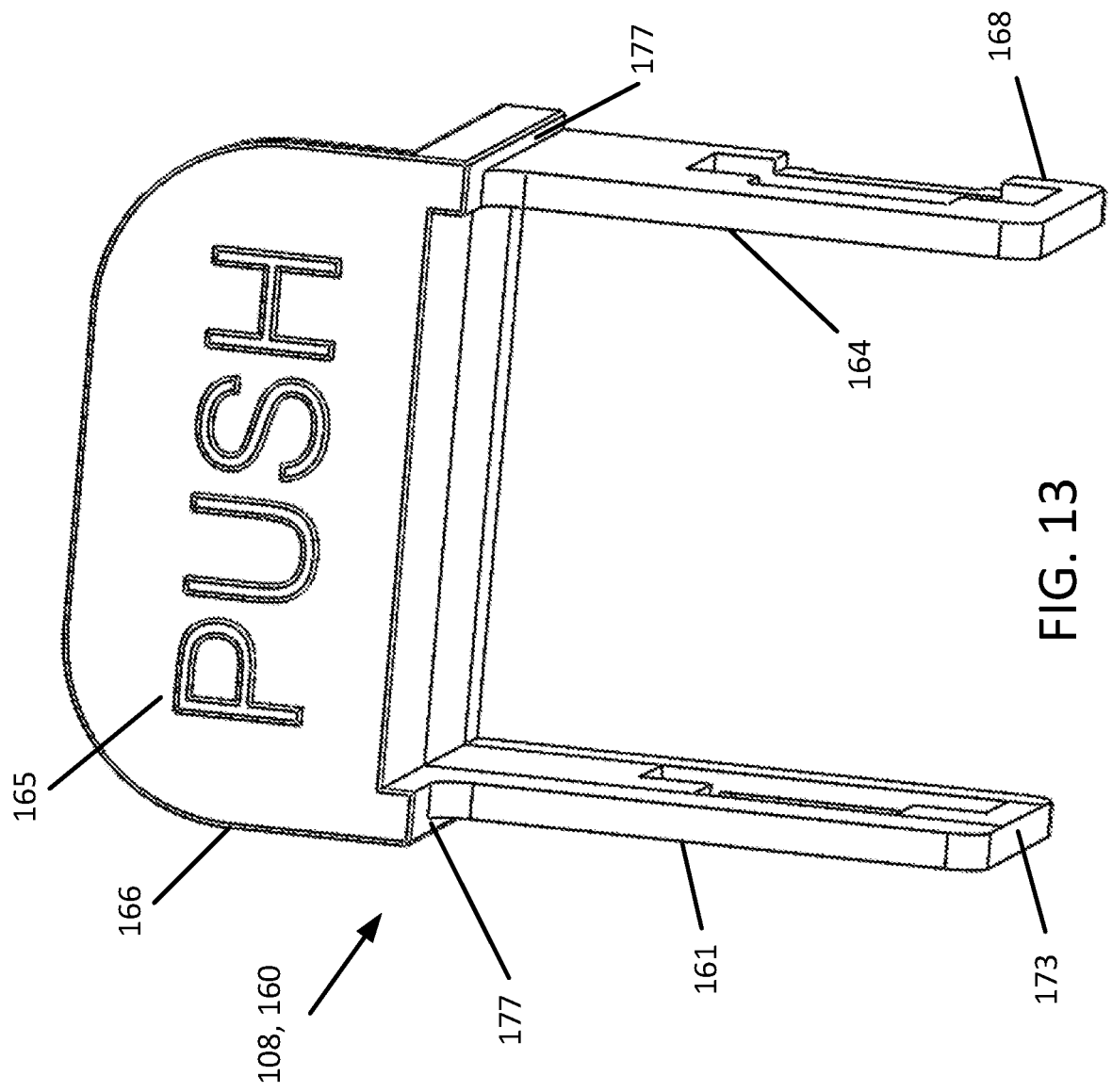
FIG. 13 is a perspective view of the second example release member of FIG. 12.
Figure 14:
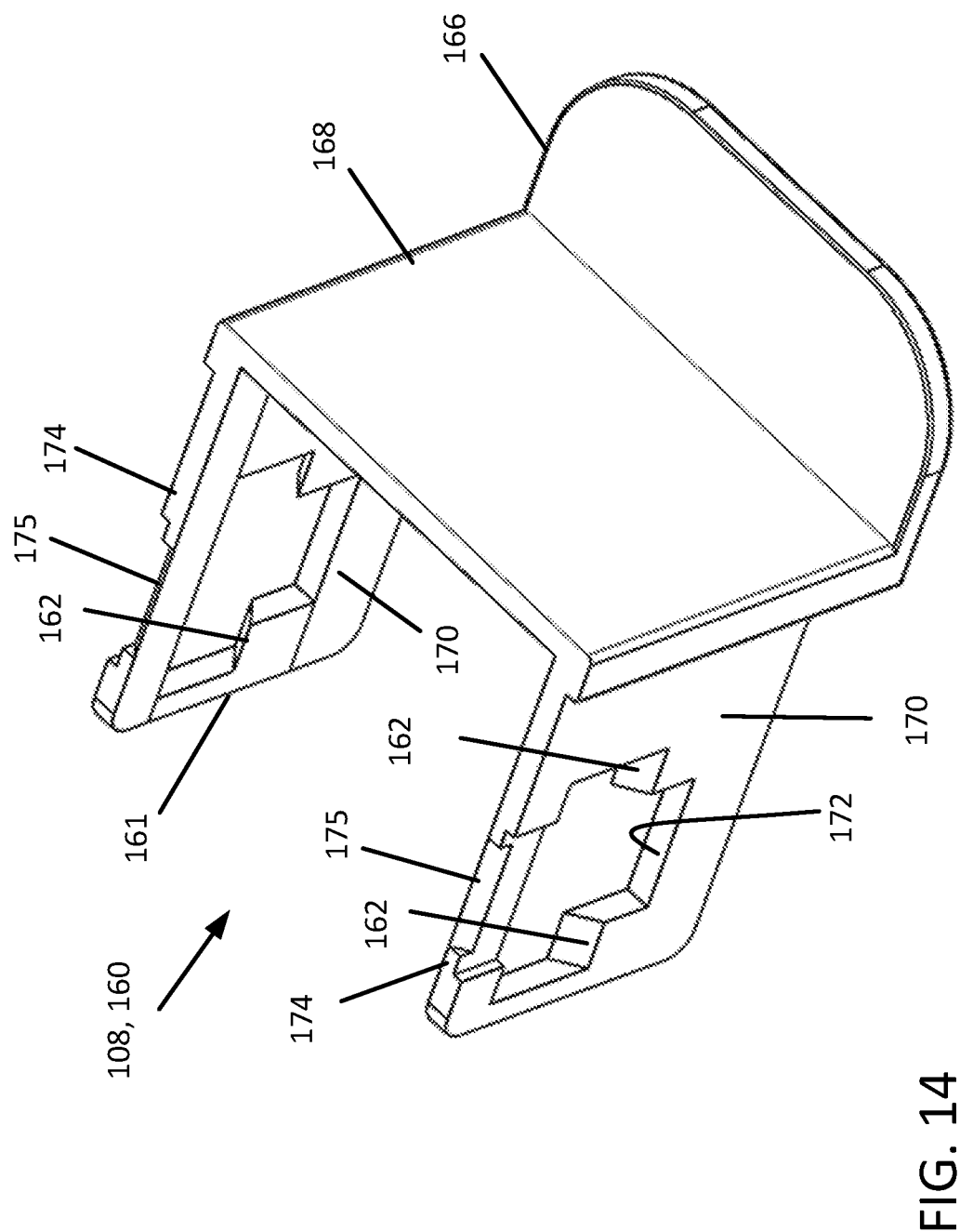
FIG. 14 is another perspective view of the second example release member of FIG. 12.
Figure 15:
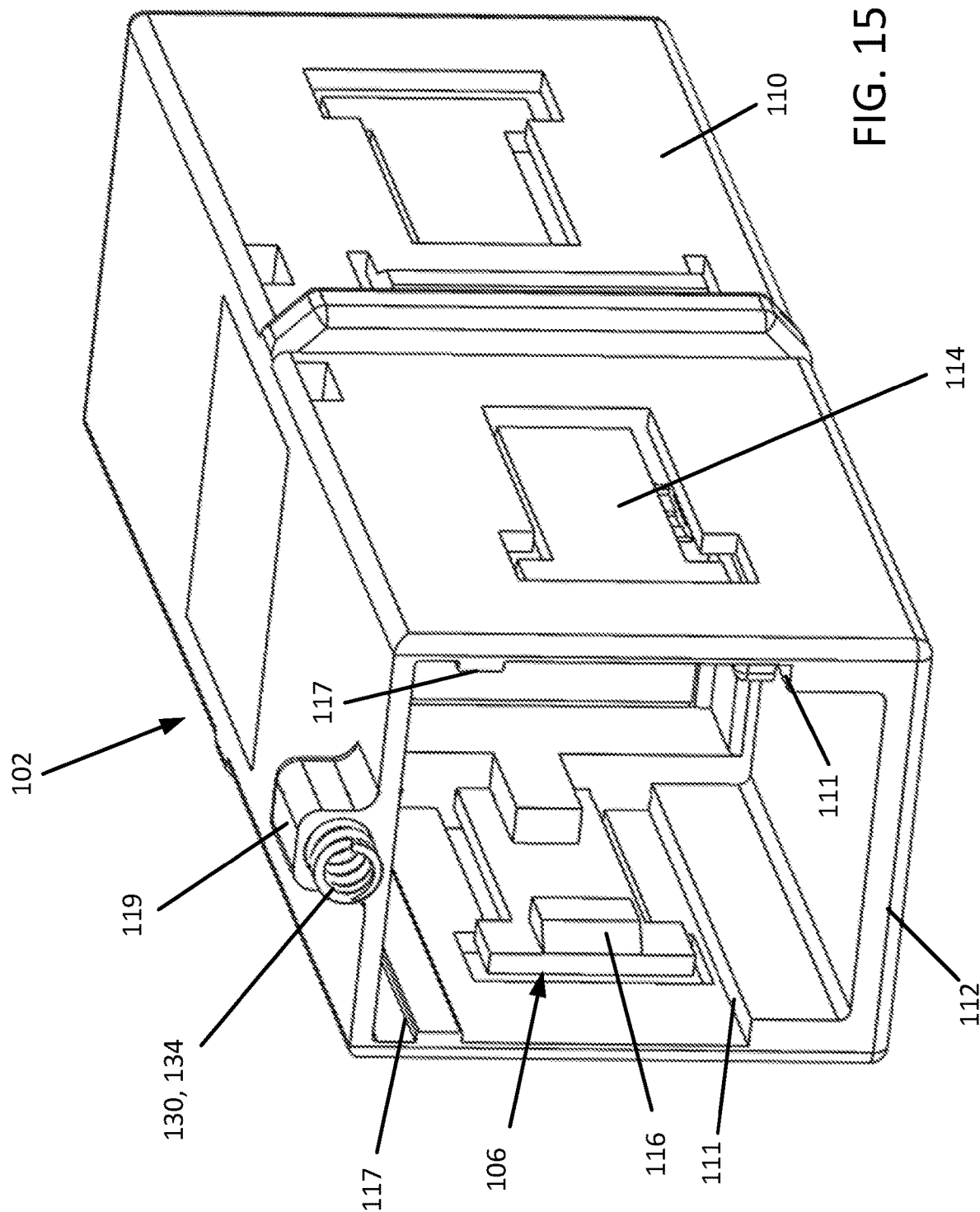
FIG. 15 is a perspective view of the plug receptacle of FIG. 12 with the release member removed for ease in viewing the port.
Figure 16:
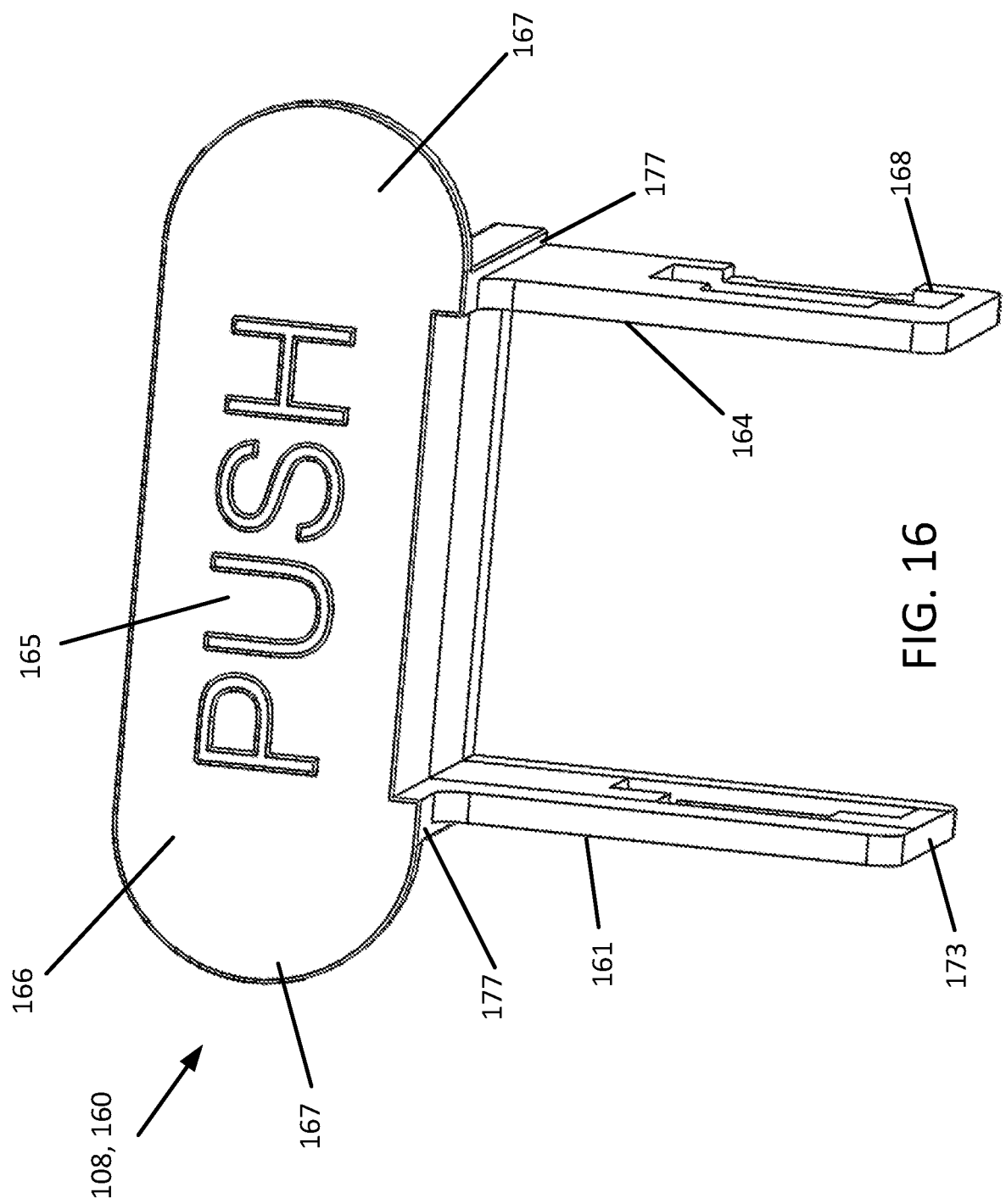
FIG. 16 is a perspective view of the second example release member of FIG. 12 having an extended actuation section.
Figure 17:
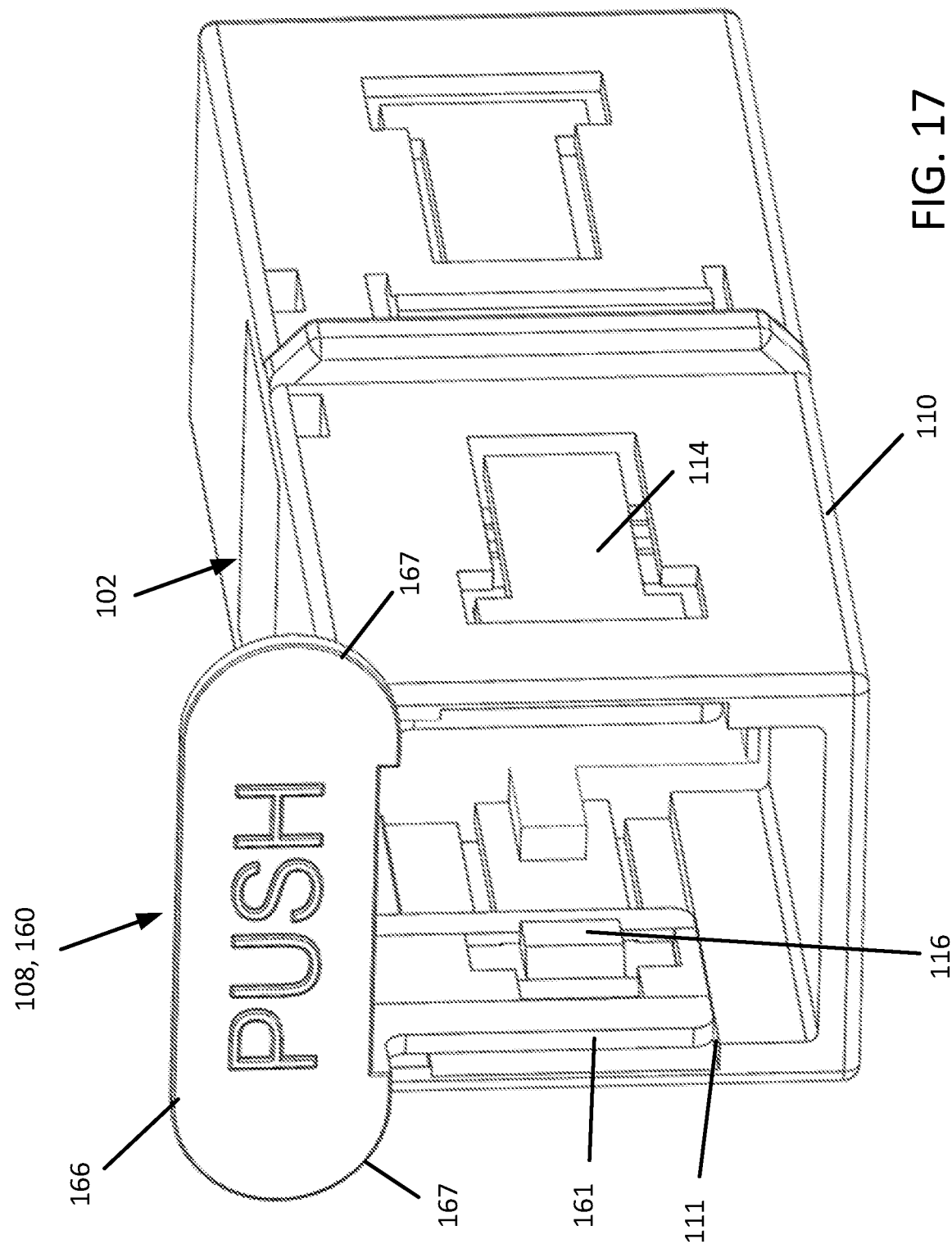
FIG. 17 is a perspective view of the release member of FIG. 16 mounted to the plug receptacle of FIG. 15.

Referring to FIGS. 5-29 in general, the release member 108 is movable along an actuation axis A between a non-actuated position (e.g., see FIG. 5) and an actuated position (e.g., see FIG. 11). The release member 108 includes a body 141, 161 having an actuation member 142, 162 that moves the plug lock 106 from the locking position to the releasing position when the release member 108 is moved from the non-actuated position to the actuated position.

In accordance with certain aspects of the disclosure, the release member 108 is movable relative to the plug lock 106. In certain implementations, the actuation member 142, 162 of the release member 108 engages the plug lock 106 when in the actuated position and is disengaged from the plug lock 106 when in the non-actuated position. In certain examples, a retention member 154 of the release member 108 engages the plug lock 106 when the release member 108 is disposed in the non-actuated position. The retention member 154 does not cause movement of the plug lock 106. Rather, in certain examples, interaction between the plug lock 106 and the retention member 154 limits movement of the release member 108 relative to the main body 110 of the plug receptacle 102 as will be described in more detail herein.

In accordance with certain aspects of the disclosure, the release member 108 is biased to the non-actuated position by a biasing member 130 separate from the plug lock 106. In certain implementations, the biasing member 130 is a separate resilient piece (e.g., a spring) that mounts between the release member 108 and a portion (e.g., the main body 110) of the plug receptacle 102. In some examples, the biasing member 130 is disposed external of the plug receptacle 102 as will be described in more detail herein with reference to the examples of FIGS. 15 and 21. In other examples, the biasing member 130 is disposed internal of the plug receptacle 102 as will be described in more detail herein with reference to the example of FIGS. 27-29. In some implementations, the biasing member 130 is carried on the release member 108 (e.g., see FIGS. 9, 23, and 29). In other implementations, the biasing member 130 is carried on the plug receptacle 102 (e.g., see FIG. 15).

In accordance with certain aspects of the disclosure, the actuation axis A extends in a common direction with the insertion axis I of the port 112. In some implementations, the actuation axis A is coaxial with the insertion axis I (e.g., see FIG. 6). In other implementations, the actuation axis A is parallel to the insertion axis I. In certain implementations, the body 140, 160 of the release member 108 is aligned with the port 112 of the main body 110. Accordingly, the plug connector 104 passes through at least a portion of the release member 108 to reach the port 112 of the plug receptacle 102. In some examples, the release member 108 includes a sleeve body 140 that defines a through passage 144 that surrounds the plug connector 104 when the plug connector 104 is received at the port 112 as will be further described with reference to FIGS. 5-11. In other examples, the release member 108 includes a saddle body 160 that defines a channel 164 along which the plug connector 104 slides when the plug connector 104 is inserted into the port 112 as will be further described with reference to FIGS. 12-17.

The body 140, 160 of the release member 108 includes an actuation section 146, 166 and an insertion portion 148, 168 that moves unitarily with the actuation section 146, 166. In certain implementations, the actuation section 146, 166 extends laterally outwardly from the port 112 in at least one direction. In certain examples, the actuation section 146, 166 extends laterally outwardly from the port 112 in multiple directions (e.g., see FIGS. 6 and 17). In an example, the actuation section 146 surrounds the port 112 of the plug receptacle 102 (e.g., see FIG. 6). In other examples, the actuation section 146 extends outwardly from the port 112 is only one direction (e.g., see FIG. 12).

In some implementations, the actuation section 146, 166 extends beyond an outer profile of the plug receptacle 102 in at least one direction. In other implementations, the actuation section 146, 166 extends over a front face of the plug receptacle 102 without crossing an outer profile of the plug receptacle 102. In certain examples, the actuation section 146, 166 is flat. In certain examples, the actuation section 146, 166 bears indicia 145, 165 (e.g., a port label, a release instruction such as the text "Push," a service provider identifier, etc.).

The insertion portion 148, 168 extends into the plug receptacle 102 through the port 112 in both the actuated and non-actuated positions. The insertion portion 148, 168 moves further into the plug receptacle 102 when the release member 108 is moved along the actuation axis A to the actuated position. In certain implementations, the actuation section 146, 166 is disposed external of the plug receptacle 102 regardless of the position of the release member 108. In certain implementations, the insertion portion 148, 168 defines the actuation member 142, 162 of the release member 108 (e.g., see FIG. 9). The actuation member 142, 162 is disposed within the plug receptacle 102 at least when the release member 108 is disposed in the actuated position. In certain examples, the actuation member 142, 162 is disposed within the plug receptacle 102 in both positions.

A user moves the release member 108 from the non-actuated position to the actuated position by applying pressure (e.g., a pushing force) against the actuation section 146, 166. As the release member 108 moves to the actuated position, the actuation section 146, 166 moves the insertion portion 148, 168 and, hence, the actuation member 142, 162 relative to the plug lock 106. The actuation member 142, 162 moves towards the plug lock 106 until the actuation member 142, 162 engages the plug lock 106 and moves the plug lock 106 to the releasing position. In certain examples, the release member 108 includes multiple actuation members 142, 162 and the plug receptacle 102 includes multiple plug locks 106 that are each moved to a releasing position by one of the actuation members 142, 162.

In certain implementations, the insertion portion 148, 168 of the release member 108 includes opposing sidewalls 150, 170 that define apertures 152, 172 each sized to receive a portion of the plug lock 106. The apertures 152, 172 allow the release member 108 to overlap the plug lock 106 without applying any force to the plug lock 106. In certain examples, each aperture 152, 172 is sized larger than the latching tab 116 of a latch arm 114 of the plug lock 106 so that the latching tab 116 can be received in the aperture 152, 172 without engaging the actuation member 142, 162 of the release member 108 (e.g., see FIG. 5).

In certain implementations, each sidewall 150, 170 includes a respective retention member 154, 174 that bounds the respective aperture 152, 172 at a distal end from the actuation section 146. When the latching tabs 116 are received within the apertures 152, 172, shoulders of the latching tabs 116 face the retention members 154, 174 to inhibit removal of the release member 108 from the plug receptacle 102. In certain examples, the retention members 154, 174 define ramped surfaces 155, 175 facing away from the apertures 152, 172. When the release member 108 is inserted into the plug receptacle 102, the ramped surfaces 155, 175 engage the camming surfaces 118 of the latching tabs 116 to deflect the latch arms 114 outwardly sufficient for the retention member 154, 174 to pass the latching tabs 116. The latching tabs 116 then snap-fit into the apertures 152, 172 to limit movement of the release member 108 relative to the plug lock 106 in a removal direction.

In certain implementations, each sidewall 150, 170 includes an actuation member 142, 162 disposed within the respective aperture 152, 172. In certain examples, each sidewall 150, 170 defines actuation members 142, 162 at opposite sides of each aperture 152, 172. The actuation members 142, 162 define camming surfaces that face the retention members 154, 174. Accordingly, moving the release member 108 relative to the plug lock 106 toward the actuated position along the actuation axis A brings the actuation members 142, 162 into engagement with the latch arms 114 of the plug lock 106. Further movement of the release member 108 to the actuated position cams the latch arms 114 to deflect the latching tabs 116 outwardly, thereby freeing the latching tabs 116 from the recessed catch surfaces 120 of the plug connector 104 (e.g., see FIG. 11).

As noted above, FIGS. 5-11 illustrate the first type 140 of release member 108. The first type 140 has a sleeve body 141 defining a through-passage 144 that aligns with the port 112 when the release member 108 is received at the plug receptacle 102. The through-passage 144 is sized and shaped to enable passage of the plug connector 104 therethrough when the plug connector 104 is inserted into the port 112 (e.g., see FIGS. 4 and 7). In the depicted example, the through-passage 144 is aligned coaxially with the port 112 of the plug receptacle 102. In the depicted example, the actuation section 146 extends fully along a perimeter of the through-passage 144. In other examples, however, the actuation section 146 may extend outwardly from less than the entire perimeter (e.g., from only one side).

In certain implementations, the biasing member 130 includes a leaf spring 132 carried by the release member 108. In certain examples, the leaf spring 132 defines an aperture through which the insertion portion 148 of the release member 140 extends so that a front side of the leaf spring 132 engages the back of the actuation section 146. When the release member 140 is coupled to the plug receptacle 102, a rear side of the leaf spring 132 engages a front face/edge of the plug receptacle 102. Accordingly, the leaf spring 132 biases the release member 140 outwardly from the port 112 along the actuation axis A to the non-actuated position (e.g., see FIG. 5). When pressure is applied to the actuation section 146 to move the release member 140 to the actuated position, the leaf spring 132 is flattened between the actuation section 146 and the front of the plug receptacle body 110 (e.g., see FIG. 11). When pressure is removed from the actuation section 146, the leaf spring 132 biases the release member 140 back to the non-actuated position.

FIGS. 12-15 illustrate an example second type 160 of the release member 108. The second type 160 has a saddle body 161 that does not surround a plug connector 102 received at the port 112. Rather, the saddle body 161 defines a channel 164 extending between the two sidewalls 170. The channel 164 aligns with the port 112 when the release member 160 couples to the plug receptacle 102. In certain examples, the saddle body 161 extends along less than a full height of the port 112. For example, bottoms 173 of the sidewalls 170 do not reach a bottom surface of the port 112.

In certain implementations, the adapter body 110 is configured to receive the saddle body 161. For example, the adapter body 110 may define rails or shelves to support the saddle body 161. In the example shown in FIG. 15, the adapter body 110 includes lower shelves 111 extending along interior sides of the adapter body 110. Bottoms 173 of the sidewalls 170 of the release member 160 seat on the lower shelves 111 to align the saddle body 161 with the port 112 (e.g., see FIG. 12). In certain examples, the adapter body 110 includes rails 117 extending along the interior sides. In such examples, the saddle body 161 includes support surfaces 177 (FIG. 13) configured to slide over the rails 117 (e.g., see FIG. 12). In other examples, the adapter body 110 may define channels that receive outwardly extending rails of the saddle body 161.

In certain implementations, the biasing member 130 includes a coil spring 134. In some implementations, the coil spring 134 is carried by the adapter body 110 (e.g., see FIG. 15). In certain examples, the adapter body 110 includes a spring push 119 for one end of the spring 134. In the depicted example, the spring push 119 forms a spring mount disposed external of the port 112. The opposite end of the spring 134 abuts the release member body 161. Accordingly, the coil spring 134 biases the release member 160 outwardly from the port 112 along the actuation axis A to the non-actuated position. When pressure is applied to the actuation section 166 to move the release member 160 to the actuated position, the coil spring 134 is compressed between the actuation section 166 and the spring push. When pressure is removed from the actuation section 166, the coil spring 134 biases the release member 160 back to the non-actuated position. In other implementations, the coil spring 134 can be carried by the release member 160 (e.g., see FIG. 23). For example, the release member 160 may include a spring mount 136 (e.g., at a rear of the actuation section 166) that holds the spring 134.

In some implementations, the actuation section 166 extends laterally outwardly from only one side of the port 112. In the example depicted in FIG. 12, the actuation section 166 extends upwardly from the port 112, but does not otherwise extend beyond the bounds of the adapter body 110. In other implementations, the actuation section 166 may extend laterally outwardly beyond multiple sides of the port 112 (e.g., see FIG. 17). For example, the actuation section 166 may include extensions 167 protruding laterally outwardly beyond the sides of the port 112 at a position offset from the port.

FIGS. 18-21 illustrate a polarity indicator 180 carried by the release member 108 (see FIG. 20) to facilitate correctly mounting the plug connector 104 at the port 112 of the plug receptacle 102. For convenience, the polarity indicator 180 is shown on the second release member type 160. It will be understood, however, that the polarity indicator 180 also could be utilized with the first release member type 140.

In accordance with some aspects of the disclosure, the plug connector 104 is configured to be inserted into the plug receptacle 102 in only one rotational orientation (e.g., based on the polarity of the plug connector 104). In some implementations, the plug connector 104 defines keying structure 128 configured to mate with another keying structure 182 disposed within the plug receptacle 102 (e.g., see FIG. 21) and/or with the polarity indicator 180 carried by the release member 108 (e.g., see FIG. 20). In some implementations, only the release sleeve 108 carries the polarity indicator 180 because the release sleeve 108 is be visible to a user while blocking visibility of structures within the port 112. In other implementations, the plug receptacle 102 also my include keying structure 182 to mate with the keying structure 128 of the plug connector 102 as will be described in more detail herein with reference to FIGS. 22-26.

Figure 19:
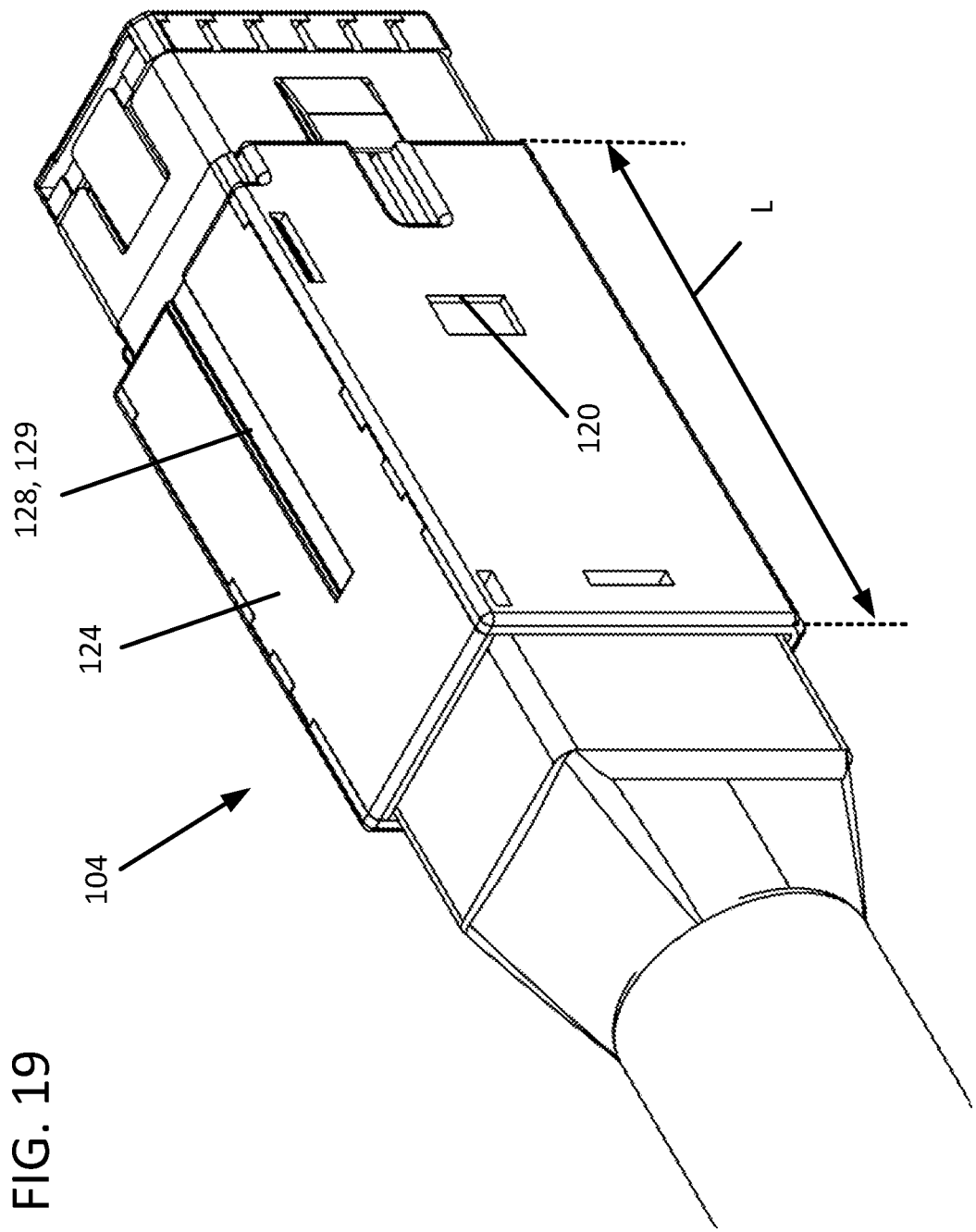
FIG. 19 is a perspective view of the plug connector of FIG. 18.

As shown in FIG. 19, the plug connector 104 defines keying structure 128 In certain examples, the keying structure 128 does not protrude beyond the footprint 122 of the outer body 124 of the plug connector 104. In the depicted example, the keying structure 128 includes a channel 129 recessed into the outer body 124 and extending at least partially along a length L of the outer body 124. In some examples, the channel 129 extends along less than a full length L of the outer body 124. In other examples, the channel 129 extends along the full length L of the outer body 124 (see FIG. 25).

Figure 20:
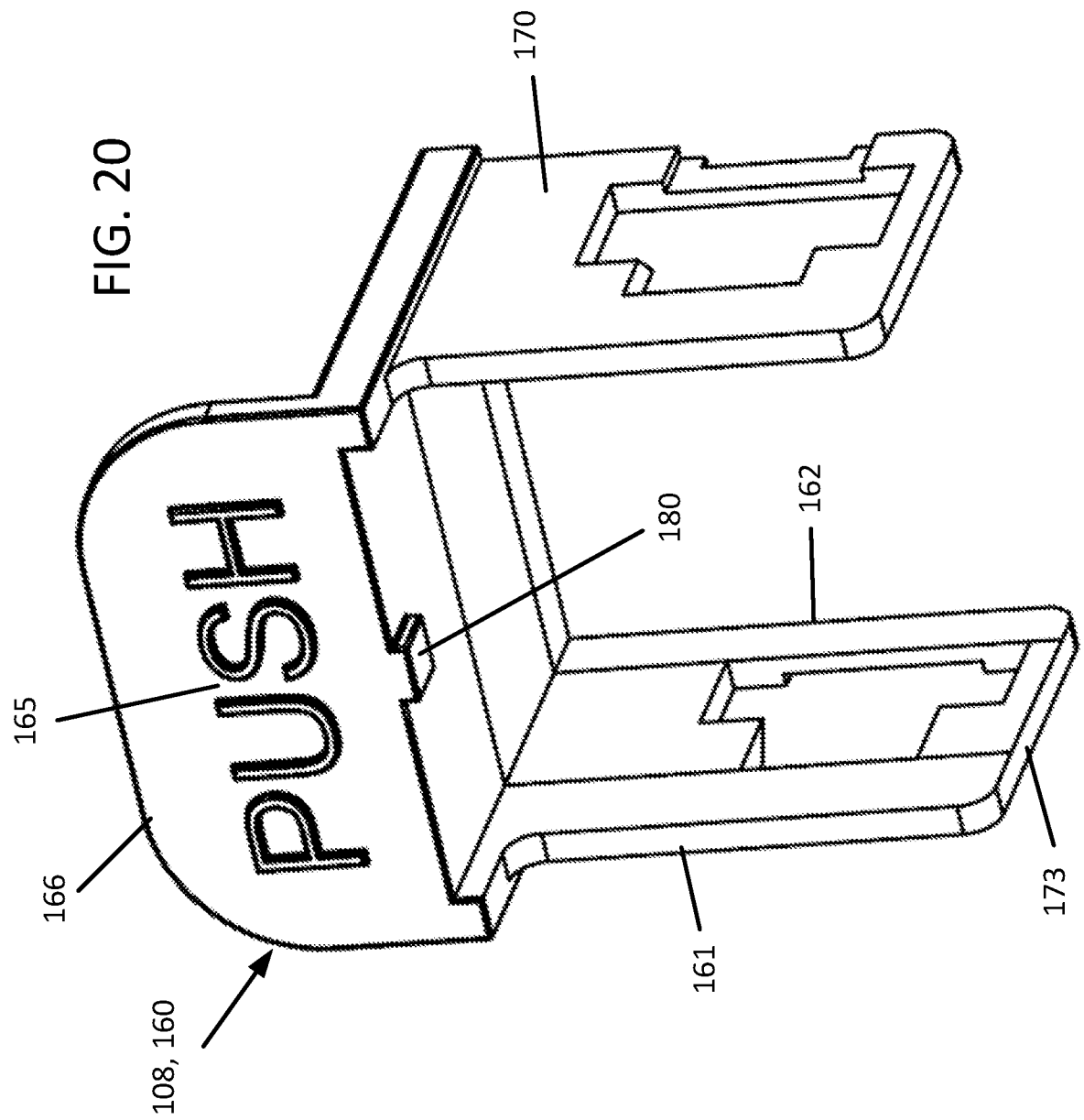
FIG. 20 is a perspective view of the release member of FIG. 18 including the polarity indicator.
Figure 21:
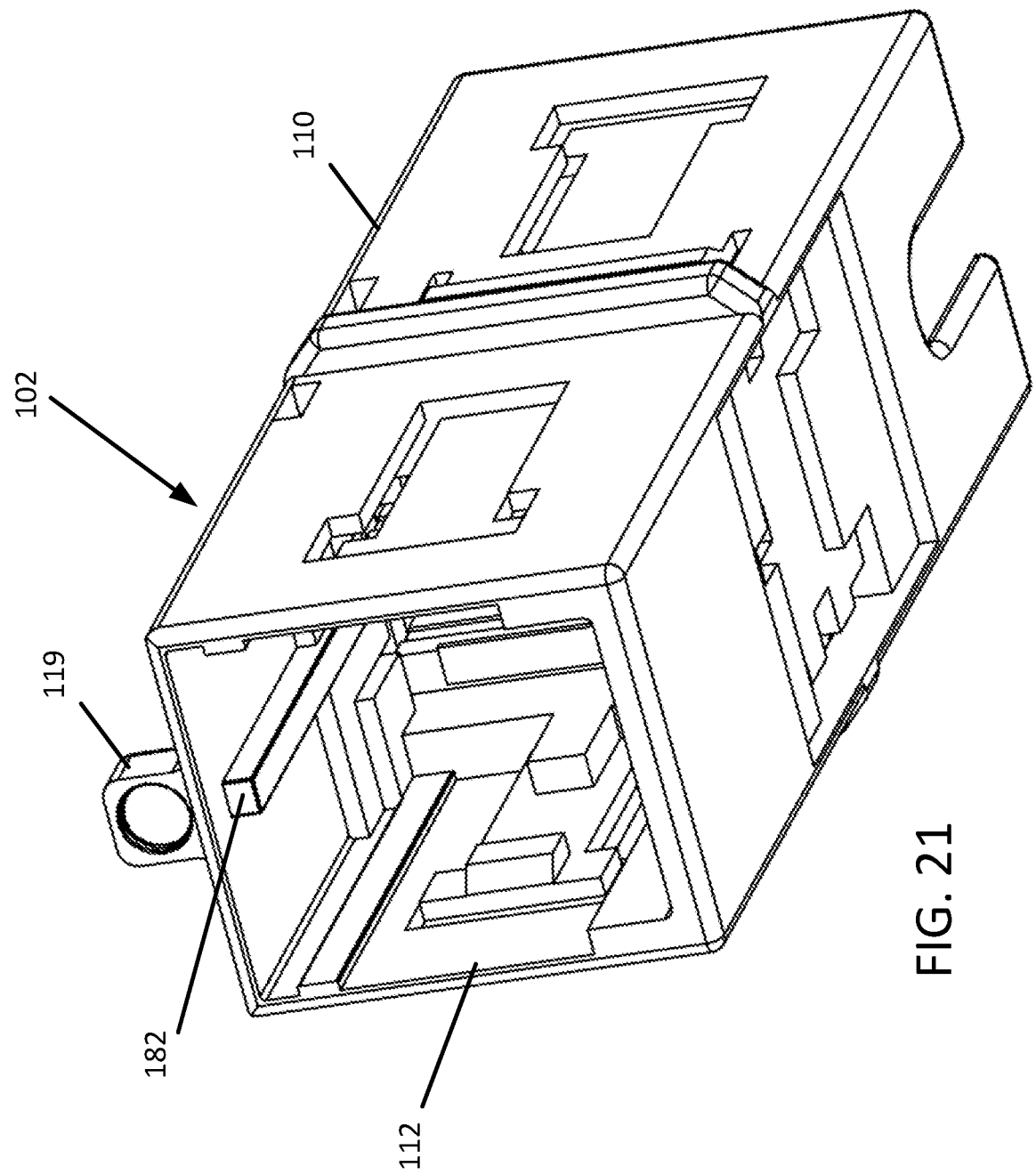
FIG. 21 is a perspective view of the plug receptacle of FIG. 18 including a keying structure disposed within the port.
Figure 22:
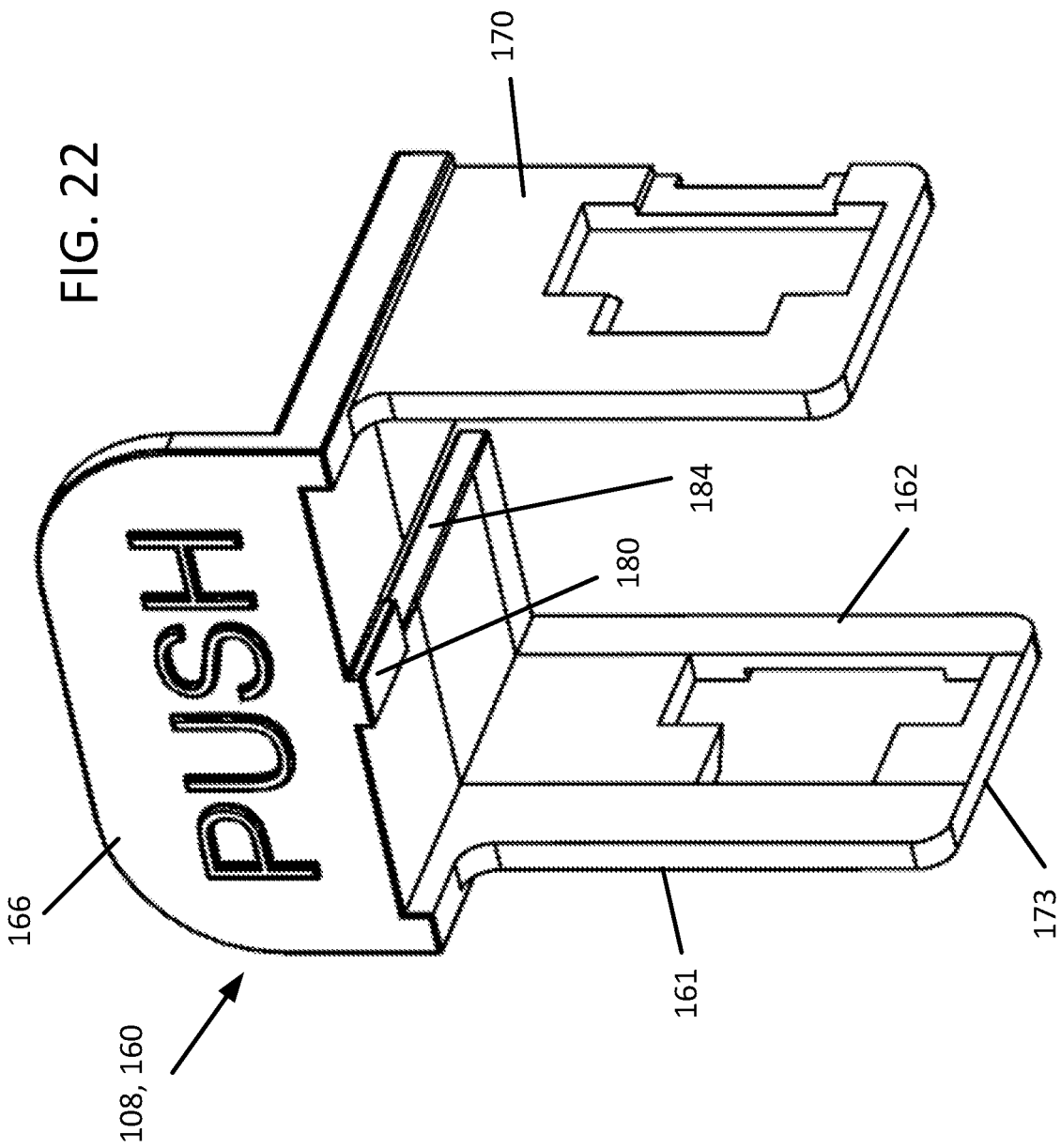
FIG. 22 is a perspective view of another example release member including a polarity indicator and a slot configured to accommodate a keying structure of the plug receptacle.
Figure 24:
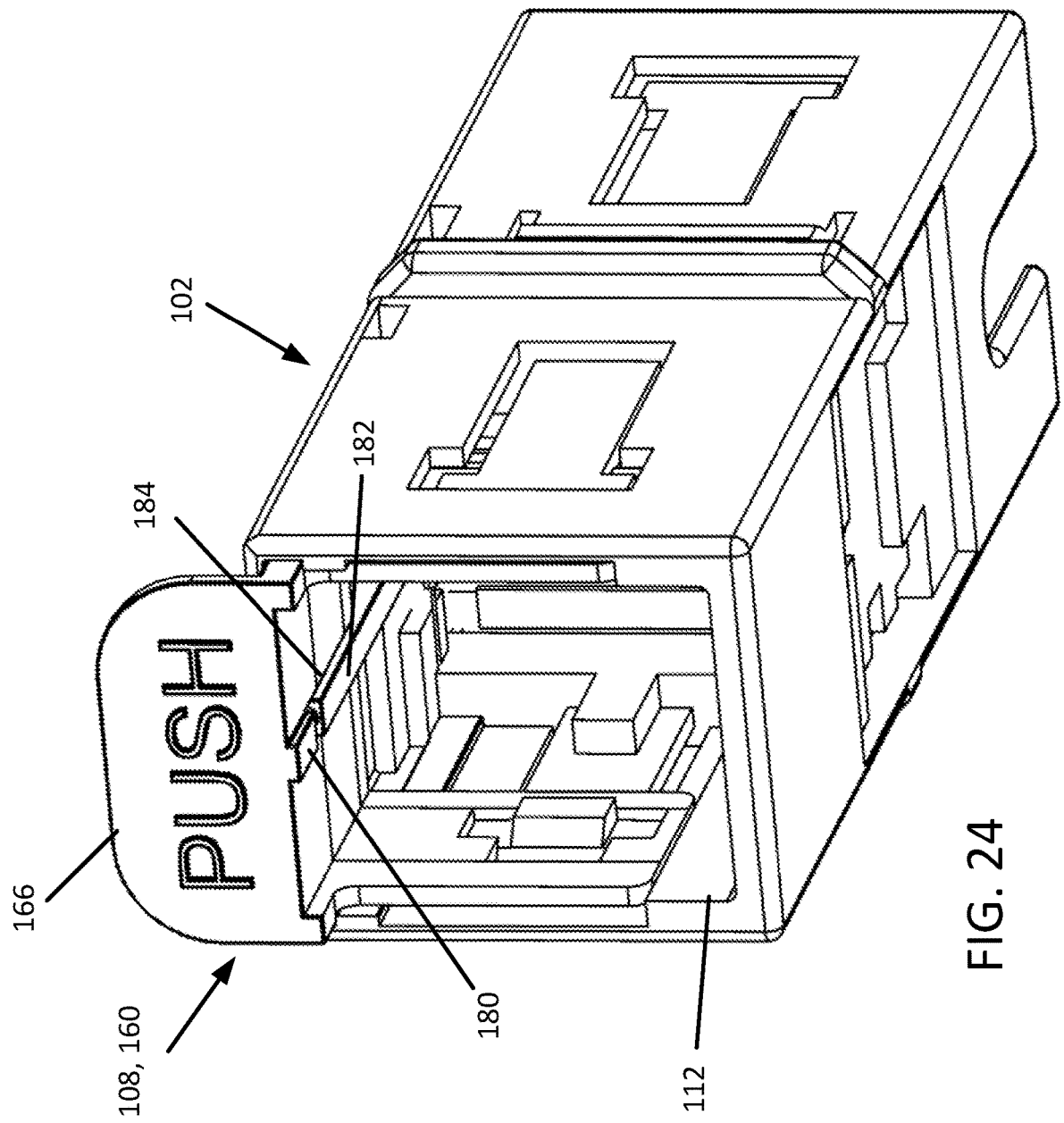
FIG. 24 is a perspective view of the release member and plug receptacle of FIG. 23 coupled together with the release member in a non-actuated position.

As shown in FIG. 20, the polarity indicator 180 may include a tab, rail, or other such protrusion extending into the channel 162 or through-passage of the release member 108. In some examples, the polarity indicator 180 extends along a full depth of the release member 108 to the port 112. In other examples, the polarity indicator 180 is disposed only at a front (i.e., side facing away from the port 112) of the release member 108. In the example shown, the polarity indicator 180 is disposed central to the sidewalls 170. In other examples, the polarity indicator 180 can be offset towards one of the sidewalls 170.

Figure 18:
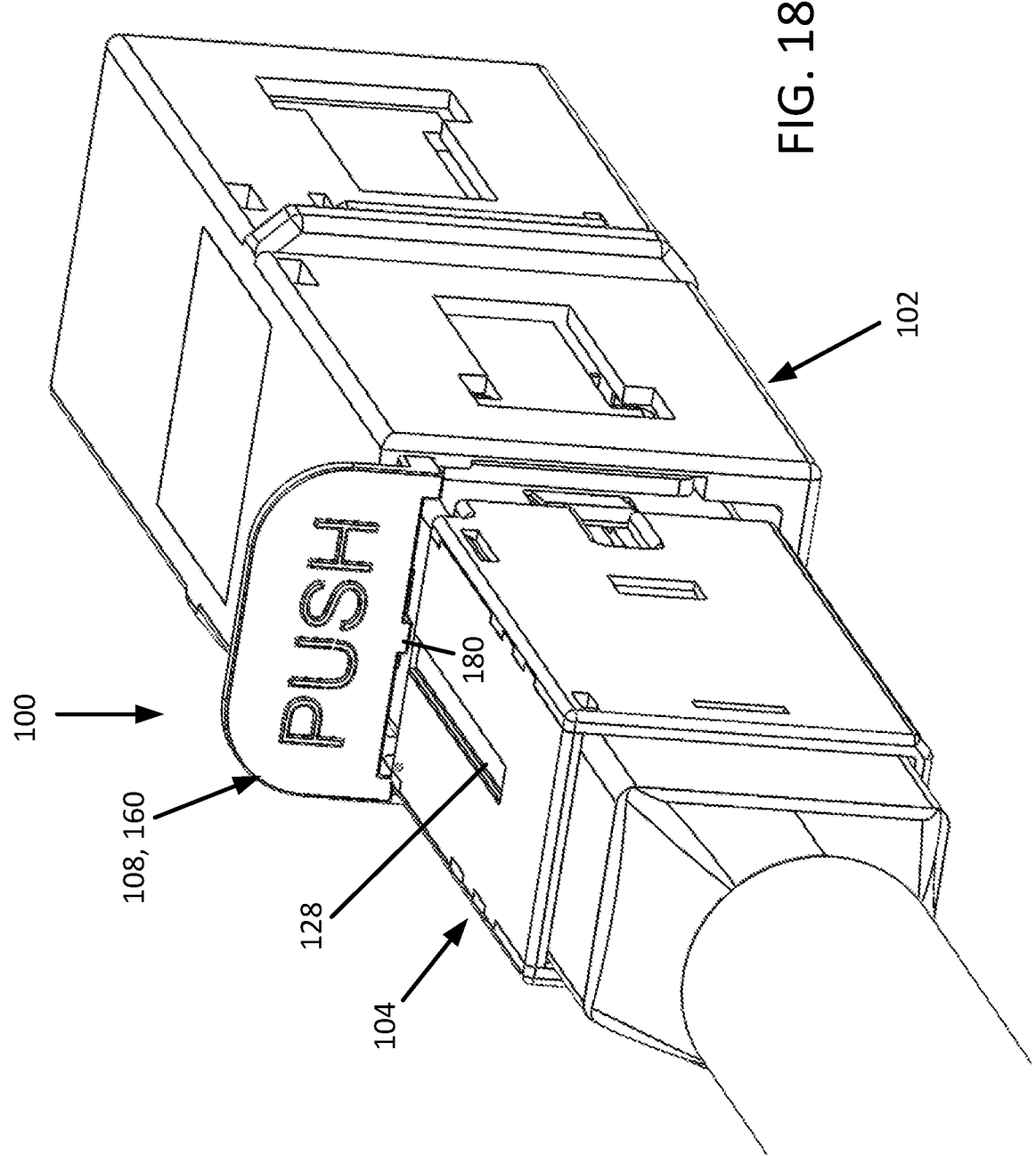
FIG. 18 is a perspective view of another example connection system including a plug connector received at the plug receptacle and release sleeve of FIG. 12, the release sleeve also being configured with a polarity indicator and the plug connector being configured with a keyway that aligns with the polarity indicator.

When the plug connector 104 is properly aligned at the port 112, the keying structure 128 of the plug connector 104 aligns with the polarity indicator 180 of the release member 108 (e.g., see FIG. 18). In certain implementations, the polarity indicator 180 extends into the port 112. In such implementations, the polarity indicator 180 slides along the channel 128 as the plug 104 is inserted through the release member 108 (e.g., through the through-passage 142 or through the channel 162) and into the plug receptacle 102. Further, the polarity indicator 180 interferes with insertion of the plug connector 104 when the plug connector 104 is not properly aligned with the port 112.

In accordance with some aspects of the disclosure, the second type of release member 160 is retrofittable to the plug receptacle 102 to release a plug connector 104. The second type of release member 160 can be mounted to a plug receptacle 102 even after a plug connector 104 is received at the port 112. The saddle body 161 and open channel 162 enable the release member 160 to be laterally mounted over an existing plug connector 104 or cable terminated thereat. The release member 108 can then be slid into the port 112 along an exterior of the plug connector 104. The When the release member 160 is inserted into the plug receptacle 102, the ramped surfaces 175 engage the camming surfaces 118 of the latching tabs 116 to deflect the latch arms 114 outwardly sufficient for the retention members 174 of the release member 160 to pass the latching tabs 116. In some examples, the ramped surfaces 175 are configured to deflect the latching arms 114 sufficient to disengage the latching tabs 116 from the recessed catch surfaces 120 on the plug connector 104. In other examples, the ramped surfaces 175 are too shallow to sufficiently deflect the arms 114 to release the plug connector 104. Instead, the latching tabs 116 snap-fit into the apertures 172 to limit movement of the release member 108 relative to the plug lock 106 in a removal direction. The release member 160 is then utilized as described above.

FIGS. 22-26 illustrate an example saddle type 160 of release member 108 that includes a polarity indicator 180 and is still retrofittable at the plug receptacle 102. In such examples, the plug receptacle 102 includes a keying structure 182 to mate with the keying structure 128 of the plug connector 104 when the release member 108 is not received at the plug receptacle 102. Accordingly, the release member 108 defines a slot 184 (e.g., see FIG. 23) to accommodate the keying structure 182 when mounted to the plug receptacle 102 (e.g., see FIG. 24).

Figure 25:
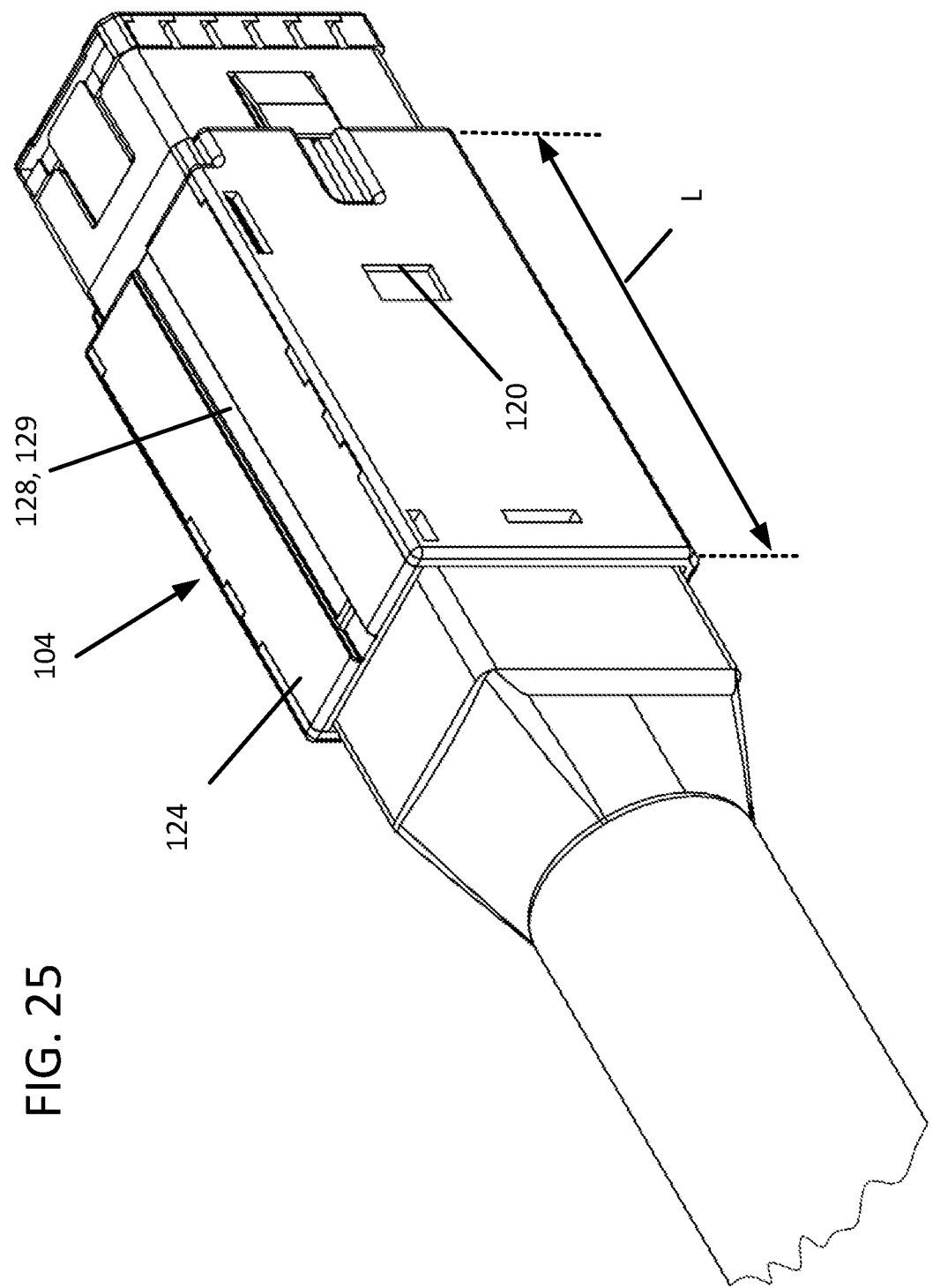
FIG. 25 is a perspective of another example plug connector having a keyway extending a full length of an outer body of the plug connector to facilitate retrofittability of the release member of FIG. 22.
Figure 26:
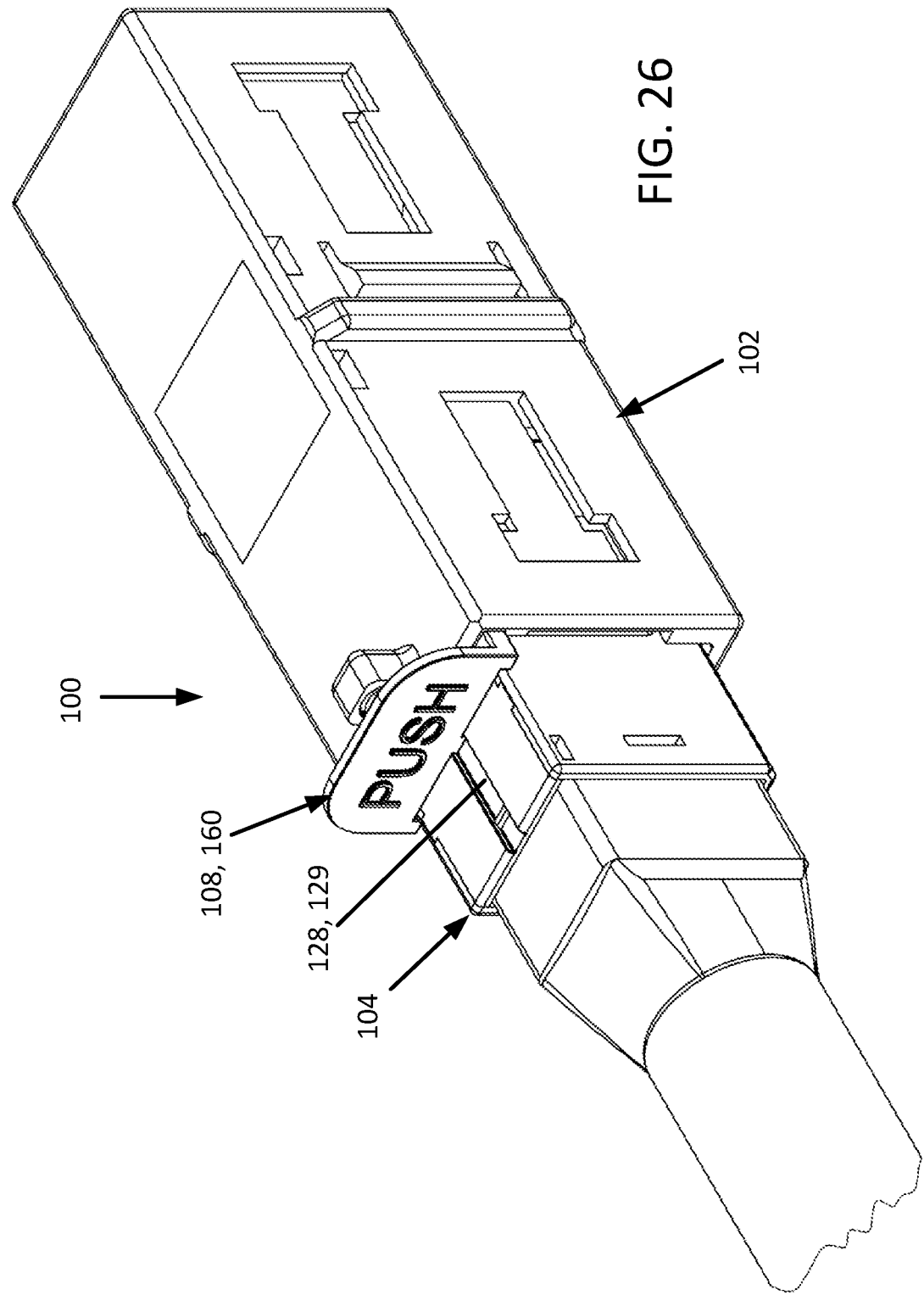
FIG. 26 is a perspective view of the plug connector of FIG. 25 received within the port of an example plug receptacle carrying the release member of FIG. 22.

As shown in FIG. 25, the plug connector 104 also is modified to enable the release member 108 to be retrofit to the plug receptacle 102. The keying channel 129 defined in the outer body 124 extends the full length L of the outer body 124. Accordingly, when the release member 108 is laterally mounted over the plug connector 104 or cable terminated thereat, the polarity indicator 180 can slide along the channel 129 towards the plug receptacle 102 in alignment with the port 112 (e.g., see FIG. 26).

FIGS. 27-29 illustrate an alternative mounting system for the biasing member 133, 134 usable with both release member types 140, 160. The biasing member 130 (e.g., a coil spring 134) can be disposed within the plug receptacle 102. Disposing the biasing member 130 within the port 112 protects the biasing member 134 and reduces the footprint of the plug receptacle 102. Disposing the biasing member 130 within the port 112 also may apply a more even biasing force to the release member 108. In some examples, the internal biasing member 130 is mounted to the plug receptacle body 110. In other examples, the internal biasing member 130 is mounted to the release member 108. In the depicted example, the biasing member 130 is carried by the release member 108.

FIG. 28 illustrates an example plug receptacle 102 including a spring push 119 configured to engage one end of the biasing member 130. In certain implementations, the spring push 119 defines an aperture leading to a recessed surface against which the biasing member 130 abuts. In other implementations, the spring push 119 may include a protrusion that can extend into the biasing member 130 (e.g., into a center of a coil spring 134). In certain examples, the spring push 119 forms keying structure 182 within the plug receptacle 102 for mating with a keyway 129 of the plug connector 104. FIG. 29 illustrates a release member 108 carrying the biasing member 130 in alignment with a slot 184 to accommodate the keying structure 182. In the example shown, the biasing member 130 includes a coil spring 134 that is mounted on a post 138 extending along a depth of the release member 108.

In the example shown, the internal biasing member 130 is shown mounted to a saddle type release member 160. In other examples, however, the internal biasing member 130 can be mounted within a slot 184 defined in the sleeve type release member 140.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A connection system comprising:
a receptacle body defining a port having an insertion axis, the receptacle body carrying a plug lock and a release member, the plug lock being biased to a locking position and the release member being separately biased to a non-actuated position;
a plug connector including an outer plug body defining a recessed catch surface, the outer plug body being configured to deflect the plug lock from the locking position to a releasing position as the plug connector is being inserted into the port, the outer plug body enabling the plug lock to return to the locking position to engage the recessed catch surface when the plug connector is fully received within the port,
wherein the release member includes a polarity key, and the outer plug body defines a keyway sized to receive the polarity key; and
wherein the release member is retrofittable to the receptacle body after the plug connector is received at the port, and the keyway defined by the outer plug body extends a full length of the outer plug body.

2. The connection system of claim 1, wherein the release member is separately formed from the plug lock.

3. The connection system of claim 1, wherein the keyway is defined at a different side of the outer plug body from the recessed catch surface.

4. The connection system of claim 1, wherein the plug lock includes a pair of deflectable latch arms at opposite sides of the port; and wherein the recessed catch surface is one of a pair of oppositely facing recessed catch surfaces defined at opposite sides of the outer plug body, each of the recessed catch surfaces being engaged by one of the latch arms when the plug connector is fully received within the port.

5. The connection system of claim 1, wherein the plug connector is devoid of structure for releasing the plug connector from the plug lock of the receptacle body.

6. The connection system of claim 1, wherein the outer plug body of the plug connector defines a rectangular transverse cross-sectional footprint beyond which no portion of the plug connector radially extends.

7. A connection system comprising:
a plug connector terminating an optical fiber, the plug connector being devoid of active connection structure, the plug connector defining a catch surface; and
an optical adapter including:
a main body holding an alignment structure, the main body also including a latch arm that engages the catch surface when the plug connector in moved towards the alignment structure along a connector insertion axis; and
a release sleeve coupled to the main body and defining a port leading to the alignment structure within the main body, the release sleeve being movable along the connector insertion axis relative to the main body between a lock position and a release position, the release sleeve disengaging the latch arm from the catch surface when disposed in the release position, the release sleeve allowing the latch arm to remain engaged with the catch surface when disposed in the lock position.

8. The connection system of claim 7, wherein applying a pulling force to the plug connector along the connector insertion axis does not disengage the latch arm from the catch surface.

9. The connection system of claim 7, wherein the release sleeve is biased to the lock position.

* * * * *